United States Patent
Yang et al.

(10) Patent No.: US 9,813,219 B2
(45) Date of Patent: Nov. 7, 2017

(54) METHOD AND APPARATUS FOR TRANSMITTING UPLINK SIGNALS IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Dongyoun Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 14/759,177

(22) PCT Filed: Jan. 3, 2014

(86) PCT No.: PCT/KR2014/000059
§ 371 (c)(1),
(2) Date: Jul. 2, 2015

(87) PCT Pub. No.: WO2014/107052
PCT Pub. Date: Jul. 10, 2014

(65) Prior Publication Data
US 2015/0341923 A1    Nov. 26, 2015

Related U.S. Application Data

(60) Provisional application No. 61/748,720, filed on Jan. 3, 2013, provisional application No. 61/750,307, filed
(Continued)

(51) Int. Cl.
*H04L 5/14*    (2006.01)
*H04W 52/14*    (2009.01)
(Continued)

(52) U.S. Cl.
CPC ............... *H04L 5/14* (2013.01); *H04L 1/18* (2013.01); *H04L 1/1861* (2013.01); *H04L 5/00* (2013.01);
(Continued)

(58) Field of Classification Search
CPC ..... H04L 5/14; H04L 1/18; H04L 5/00; H04L 5/0055; H04W 52/146; H04W 52/365
(Continued)

(56) References Cited

U.S. PATENT DOCUMENTS 8,861,391 B1    10/2014    Zhang et al.
8,902,842 B1    12/2014    Gomadam et al.
(Continued)

FOREIGN PATENT DOCUMENTS

CN    102845016    12/2012
EP    2421191    2/2012
(Continued)

OTHER PUBLICATIONS

WO2012094151:Wang, Ping:Chatterjee, Debdeep:Intel Corporation:Resource Allocation for PUCCH Format 1B With Channel Selection in an LTE-A TDD System: Jul. 12, 2012 (Jul. 12, 2012).*
(Continued)

*Primary Examiner* — Kodzovi Acolatse
(74) *Attorney, Agent, or Firm* — Lee Hong Degerman Kang Waimey

(57) ABSTRACT

The present invention relates to a wireless communication system. More particularly, the present invention relates to a method and an apparatus for a terminal transmitting ACK/NACK information in a carrier aggregation-based wireless communication system, comprising the steps of: receiving one or more PDCCH signals from a specific SF section in an FDD cell; receiving one or more PDSCH signals indicated
(Continued)

by the one or more PDCCH signals; and transmitting ACK/NACK information corresponding to the one or more PDSCH signals through a physical uplink control channel (PUCCH), wherein the specific SF section includes one or more first SFs and one second SF, wherein PUCCH transmission is limited in one or more first UL SFs corresponding to the one or more first SFs, wherein PUCCH transmission is allowed from a second UL SF corresponding to the second SF, the ACK/NACK information is transmitted from the second UL SF by using a PUCCH resource allocated by an upper layer when a PDSCH signal exists in the one or more first SFs, and wherein the ACK/NACK information is transmitted from the second UL SF by using a PUCCH resource linked to an index of a resource from which a corresponding PDCCH signal is transmitted when one PDSCH signal exists only in the second SF.

10 Claims, 19 Drawing Sheets

Related U.S. Application Data on Jan. 8, 2013, provisional application No. 61/808,614, filed on Apr. 4, 2013, provisional application No. 61/817,341, filed on Apr. 30, 2013, provisional application No. 61/836,176, filed on Jun. 18, 2013, provisional application No. 61/838,350, filed on Jun. 24, 2013, provisional application No. 61/866,555, filed on Aug. 16, 2013, provisional application No. 61/872,858, filed on Sep. 3, 2013, provisional application No. 61/890,347, filed on Oct. 14, 2013, provisional application No. 61/897,202, filed on Oct. 29, 2013.

(51) Int. Cl.
  *H04L 5/00* (2006.01)
  *H04L 1/18* (2006.01)
  *H04W 52/36* (2009.01)
  *H04L 1/16* (2006.01)

(52) U.S. Cl.
  CPC ......... *H04L 5/0055* (2013.01); *H04W 52/146* (2013.01); *H04L 1/1671* (2013.01); *H04W 52/365* (2013.01)

(58) Field of Classification Search
  USPC .......................................................... 370/329
  See application file for complete search history.

(56) References Cited

U.S. PATENT DOCUMENTS

| | | | |
|---|---|---|---|
| 8,917,603 B2 | 12/2014 | Yang et al. | |
| 9,014,173 B2 | 4/2015 | Yang et al. | |
| 9,124,327 B2 | 9/2015 | Gomadam et al. | |
| 9,172,519 B2 | 10/2015 | Seo et al. | |
| 9,331,819 B2 | 5/2016 | Si et al. | |
| 9,497,011 B2 | 11/2016 | Gao et al. | |
| 9,515,782 B2 | 12/2016 | Lin et al. | |
| 9,520,984 B2 | 12/2016 | Yang et al. | |
| 9,572,138 B2 | 2/2017 | Lee et al. | |
| 2010/0254329 A1 | 10/2010 | Pan et al. | |
| 2011/0235602 A1 | 9/2011 | Ji et al. | |
| 2011/0250899 A1 | 10/2011 | Vajapeyam et al. | |
| 2011/0261729 A1 | 10/2011 | Ahn et al. | |
| 2011/0268045 A1 | 11/2011 | Heo et al. | |
| 2011/0275403 A1 | 11/2011 | Chen et al. | |
| 2011/0287804 A1 | 11/2011 | Seo et al. | |
| 2011/0292826 A1 | 12/2011 | Ahn et al. | |
| 2012/0039280 A1 | 2/2012 | Chen et al. | |
| 2012/0113907 A1 | 5/2012 | Baldemair et al. | |
| 2012/0113910 A1 | 5/2012 | Jen | |
| 2012/0269179 A1 | 10/2012 | Li et al. | |
| 2012/0327821 A1 | 12/2012 | Lin et al. | |
| 2013/0028214 A1 | 1/2013 | Imamura et al. | |
| 2013/0039289 A1 | 2/2013 | Lee et al. | |
| 2013/0051259 A1 | 2/2013 | Kim et al. | |
| 2013/0128854 A1 | 5/2013 | Nakashima et al. | |
| 2013/0148614 A1 | 6/2013 | Noh et al. | |
| 2013/0208710 A1 | 8/2013 | Seo et al. | |
| 2013/0250925 A1 | 9/2013 | Lohr et al. | |
| 2013/0272229 A1 | 10/2013 | Dinan | |
| 2013/0279433 A1 | 10/2013 | Dinan | |
| 2013/0295976 A1 | 11/2013 | Patil et al. | |
| 2013/0336300 A1 | 12/2013 | Choi et al. | |
| 2014/0029584 A1 | 1/2014 | Qu et al. | |
| 2014/0029586 A1 | 1/2014 | Loehr et al. | |
| 2014/0036810 A1* | 2/2014 | Harrison | H04W 72/042 370/329 |
| 2014/0050205 A1 | 2/2014 | Ahn et al. | |
| 2014/0056278 A1 | 2/2014 | Marinier et al. | |
| 2014/0078941 A1 | 3/2014 | Seo et al. | |
| 2014/0126403 A1 | 5/2014 | Siomina | |
| 2014/0126440 A1 | 5/2014 | Frank et al. | |
| 2014/0126530 A1 | 5/2014 | Siomina et al. | |
| 2014/0128115 A1 | 5/2014 | Siomina et al. | |
| 2014/0171144 A1 | 6/2014 | Kim et al. | |
| 2014/0192757 A1 | 7/2014 | Lee et al. | |
| 2014/0204811 A1 | 7/2014 | Lu et al. | |
| 2014/0226551 A1 | 8/2014 | Ouchi et al. | |
| 2014/0295909 A1 | 10/2014 | Ouchi et al. | |
| 2014/0302866 A1 | 10/2014 | Lee et al. | |
| 2015/0156764 A1 | 6/2015 | Yang et al. | |
| 2015/0188687 A1 | 7/2015 | Gao et al. | |
| 2015/0208402 A1 | 7/2015 | Hwang et al. | |
| 2015/0230236 A1 | 8/2015 | Zeng et al. | |
| 2015/0304967 A1 | 10/2015 | Kim et al. | |
| 2015/0319703 A1 | 11/2015 | Kwon et al. | |
| 2015/0341864 A1 | 11/2015 | Yang et al. | |
| 2015/0341865 A1 | 11/2015 | Yang et al. | |
| 2015/0365831 A1 | 12/2015 | Ko et al. | |
| 2017/0013563 A1 | 1/2017 | Yang et al. | |

FOREIGN PATENT DOCUMENTS

| | | |
|---|---|---|
| JP | 2012-104960 | 5/2012 |
| JP | 2012516607 | 7/2012 |
| JP | 2012517747 | 8/2012 |
| JP | 2012-191666 | 10/2012 |
| JP | 2012216968 | 11/2012 |
| JP | 2013529030 | 7/2013 |
| KR | 10-2010-0100667 | 9/2010 |
| KR | 10-2011-0127253 | 11/2011 |
| KR | 10-2012-0090081 | 8/2012 |
| KR | 10-2012-0093913 | 8/2012 |
| KR | 10-2012-0094923 | 8/2012 |
| WO | 2010087622 | 8/2010 |
| WO | 2010091425 | 8/2010 |
| WO | 2010/103862 | 9/2010 |
| WO | 2011/053056 | 5/2011 |
| WO | 2011/139027 | 11/2011 |
| WO | 2011140504 | 11/2011 |
| WO | 2011/159121 | 12/2011 |
| WO | 2012/008773 | 1/2012 |
| WO | 2012017941 | 2/2012 |
| WO | 2012/036514 | 3/2012 |
| WO | 2012/094151 | 7/2012 |
| WO | 2012/128513 | 9/2012 |

OTHER PUBLICATIONS

CATT: "Resource Allocation for PUCCH format 3" 3GPP Draft: R1-105153, vol. RAN WG1, Xi'an; Oct. 11-15, 2010.*
PCT International Application No. PCT/KR2014/000060, Written Opinion of the International Searching Authority dated Apr. 22, 2014, 18 pages.
PCT International Application No. PCT/KR2014/000057, Written Opinion of the International Searching Authority dated May 16, 2014, 16 pages.

(56) References Cited

OTHER PUBLICATIONS

PCT International Application No. PCT/KR2014/000058, Written Opinion of the International Searching Authority dated Mar. 31, 2014, 15 pages.

U.S. Appl. No. 14/759,164, Office Action dated Mar. 3, 2016, 17 pages.

U.S. Appl. No. 14/759,170, Office Action dated Mar. 4, 2016, 15 pages.

Qualcomm, "Support of CA for different TDD UL-DL configurations ," 3GPP TSG-RAN WG1 #68, R1-121793, Mar. 2012, 4 pages.

Blankenship, "Achieving High Capacity with Small Cells in LTE-A," Fiftieth Annual Allerton Conference, XP032345203, Oct. 2012, 8 pages.

CMCC, "Discussion on the solutions for common information interference coordination in TDD systems," 3GPP TSG-RAN WG1 #63, R1-106312, Nov. 2010, 4 pages.

CATT,"Resource Allocation for PUCCH Format 3," 3GPP TSG-RAN WG1 #62, R1-105153, Oct. 2010, 4 pages.

Qualcomm Incorporated,"UL Power Control for Multicarrier Operation," 3GPP TSG-RAN WG1 #59, R1-100677, Jan. 2010, 5 pages.

Intel Corporation,"UL Control Enhancements for Small Cell Environments," 3GPP TSG-RAN WG1 #73, R1-132391, May 2013, 4 pages.

Fujitsu,"Discussion on physical layer impacts of dual connectivity," 3GPP TSG-RAN WG1 #74, R1-133138, Aug. 2013, 5 pages.

European Patent Office Application Serial No. 14735393.2, Search Report dated Jul. 27, 2016, 9 pages.

European Patent Office Application Serial No. 14735251.2, Search Report dated Aug. 2, 2016, 7 pages.

European Patent Office Application Serial No. 14735104.3, Search Report dated Jul. 28, 2016, 8 pages.

European Patent Office Application Serial No. 14735347.8, Search Report dated Jul. 21, 2016, 10 pages.

PCT International Application No. PCT/KR2014/000059, Written Opinion of the International Searching Authority dated Apr. 15, 2014, 15 pages.

U.S. Appl. No. 15/352,369, Office Action dated Mar. 16, 2017, 7 pages.

U.S. Appl. No. 14/759,161, Office Action dated Mar. 24, 2017, 11 pages.

U.S. Appl. No. 15/352,369, Notice of Allowance dated Jun. 29, 2017, 9 pages.

European Patent Office Application Serial No. 14735104.3, Office Action dated Jun. 7, 2017, 6 pages.

HTC, et al, "Reusing PUCCH format 3 to multiplex CSI reports for DL CoMP", R1-124350, 3GPP TSG-RAN WGI #70bis, Oct. 2012, 5 pages.

ST-Ericsson, "CSI requirement for Rel-IO CA", R4-124223, 3GPP TSG-RAN WG4 Meeting #64, Aug. 2012, 6 pages.

The State Intellectual Property Office of the People's Republic of China Application Serial No. 201480003962.0 Office Action dated Jul. 4, 2017, 6 pages.

* cited by examiner

PUCCH format 1a and 1b structure (normal CP case)

PUSCH-PHICH/UL grant timing (UL-DL configuration #1)

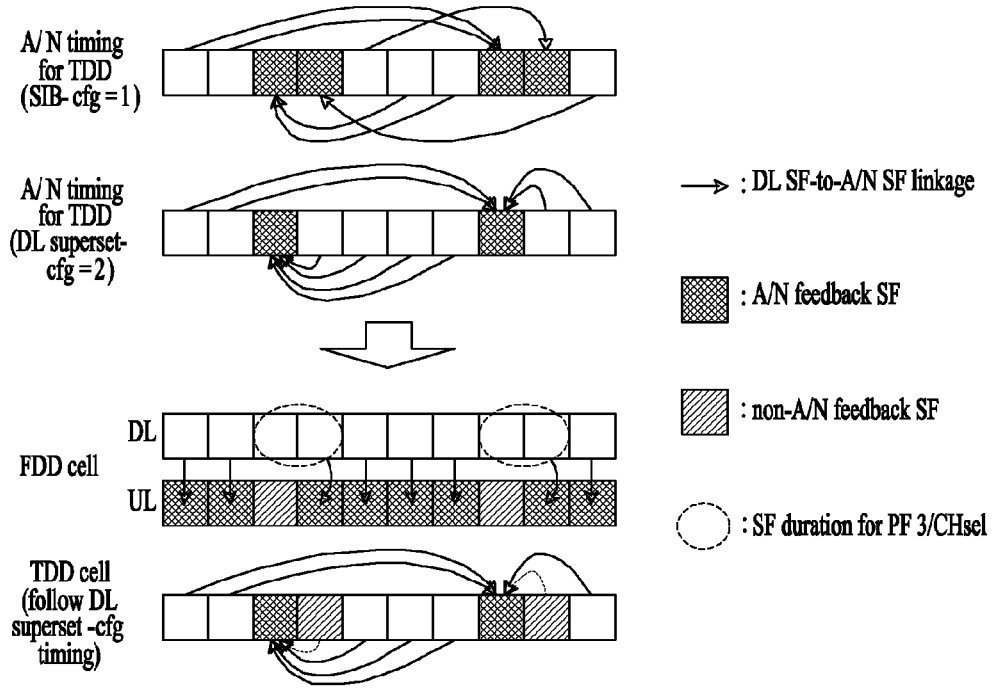
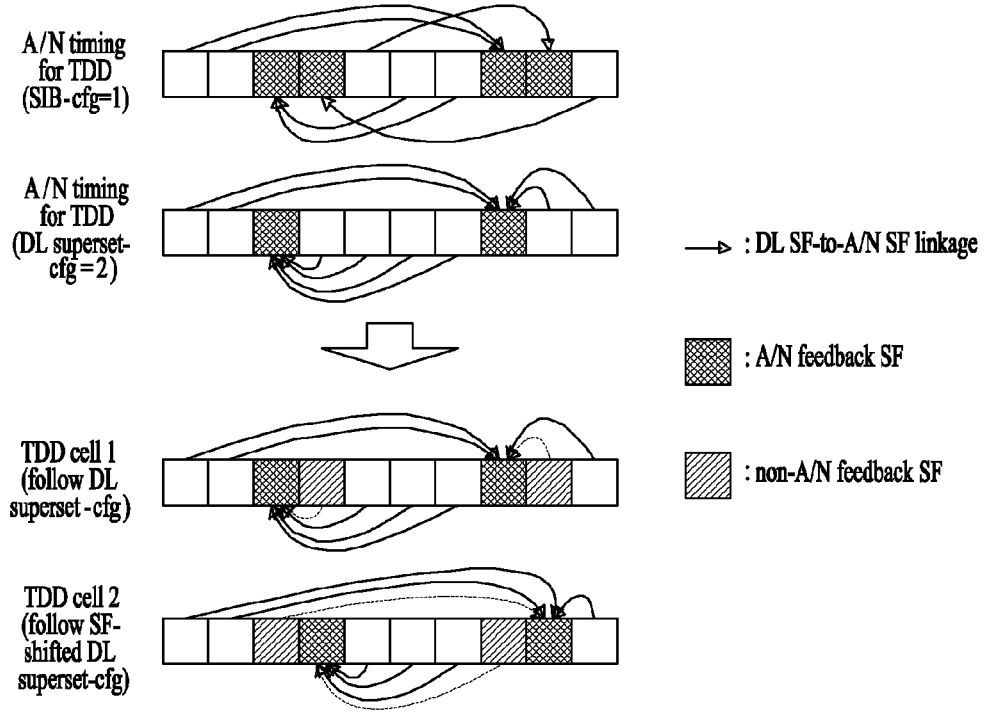

METHOD AND APPARATUS FOR TRANSMITTING UPLINK SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2014/000059, filed on Jan. 3, 2014, which claims the benefit of U.S. Provisional Application No. 61/748,720, filed on Jan. 3, 2013, 61/750,307, filed on Jan. 8, 2013, 61/808,614, filed on Apr. 4, 2013, 61/817,341, filed on Apr. 30, 2013, 61/836,176, filed on Jun. 18, 2013, 61/838,350, filed on Jun. 24, 2013, 61/866,555, filed on Aug. 16, 2013, 61/872,858, filed on Sep. 3, 2013, 61/890,347, filed on Oct. 14, 2013 and 61/897,202, filed on Oct. 29, 2013, the contents of which are all hereby incorporated by reference herein in their entirety.

TECHNICAL FIELD

The present invention relates to a wireless communication system and, more particularly, to a method and an apparatus for transmitting uplink signals in a carrier aggregation (CA)-based wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method and an apparatus for efficiently transmitting/receiving uplink signals in a CA-based wireless communication system. Specifically, the present invention provides a method for efficiently transmitting/receiving uplink signals in inter-site carrier aggregation (CA) and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to one aspect of the present invention, a method for transmitting, by a UE, acknowledgement/negative acknowledgement (ACK/NACK) information in a carrier aggregation based wireless communication system includes: receiving one or more physical downlink control channel (PDCCH) signals in a specific subframe (SF) interval of a frequency division duplex (FDD) cell; receiving one or more physical downlink shared channel (PDSCH) signals indicated by the one or more PDCCH signals; and transmitting ACK/NACK information corresponding to the one or more PDSCH signals through a physical uplink control channel (PUCCH), wherein the specific SF interval includes one or more first SFs and one second SF, wherein PUCCH transmission is limited in one or more first UL SFs corresponding to the one or more first SFs, and PUCCH transmission is allowed in a second UL SF corresponding to the second SF, wherein the ACK/NACK information is transmitted in the second UL SF by using a PUCCH resource allocated by an upper layer when a PDSCH signal is present in the one or more first SFs, wherein the ACK/NACK information is transmitted in the second UL SF by using a PUCCH resource linked to an index of a resource through which a corresponding PDCCH signal is transmitted when one PDSCH signal is present only in the second SF.

According to another aspect of the present invention, a UE configured to transmit acknowledgement/negative acknowledgement (ACK/NACK) information in a carrier aggregation based wireless communication system includes: a radio frequency (RF) unit; and a processor, wherein the processor is configured to receive one or more PDCCH signals in a specific SF interval of am FDD cell, to receive one or more PDSCH signals indicated by the one or more PDCCH signals and to transmit ACK/NACK information corresponding to the one or more PDSCH signals through a PUCCH, wherein the specific SF interval includes one or more first SFs and one second SF, wherein PUCCH transmission is limited in one or more first UL SFs corresponding to the one or more first SFs, and PUCCH transmission is allowed in a second UL SF corresponding to the second SF, wherein the ACK/NACK information is transmitted in the second UL SF by using a PUCCH resource allocated by an upper layer when a PDSCH signal is present in the one or more first SFs, wherein the ACK/NACK information is transmitted in the second UL SF by using a PUCCH resource linked to an index of a resource through which a corresponding PDCCH signal is transmitted when one PDSCH signal is present only in the second SF.

The second SF may be placed at the end of the specific SF interval.

When a PDSCH signal is present in the one or more first SFs, the ACK/NACK information may be transmitted using a PUCCH resource indicated by a value of a transmit power control (TPC) field of the corresponding PDCCH signal, wherein the TPC field value indicates one of a plurality of PUCCH resources allocated by the higher layer.

When a PDSCH signal is present in the one or more first SFs, the ACK/NACK information may be transmitted using PUCCH format 3.

When one PDSCH signal is present only in the second SF, the ACK/NACK information may be transmitted using a PUCCH resource acquired using the first control channel element (CCE) index from among one or more CCE indices corresponding to one or more CCEs used to transmit the corresponding PDCCH signal.

When one PDSCH signal is present only in the second SF, the ACK/NACK information may be transmitted using PUCCH format 1a or PUCCH format 1b.

Advantageous Effects

According to the present invention, it is possible to efficiently transmit/receive uplink signals in a CA-based wireless communication system. Specifically, it is possible to efficiently transmit/receive uplink signals in inter-site CA.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 20 to 25 illustrate ACK/NACK transmission according to embodiments of the present invention.

BEST MODE

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and employs OFDMA in downlink and SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, specific terminologies used in the following description are provided to help the present invention to be understood. The specific terminologies can be modified into a different form within a range not deviating from a technical idea of the present invention.

The terms used in the specification will now be described.

HARQ-ACK (Hybrid Automatic Repeat request-Acknowledgement): this represents an acknowledgment response to downlink transmission, that is, an ACK/NACK (Negative ACK)/DTX (Discontinuous Transmission) response (simply, ACK/NACK (response), ACK/NAK (response), A/N (response)). The ACK/NACK response refers to ACK, NACK, DTX or NACK/DTX. Downlink transmission that requires HARQ-ACK feedback includes transmission of a PDSCH (Physical Downlink shared Channel) and transmission of an SPS release PDCCH (Semi-Persistent Scheduling release Physical Downlink Control channel).

HARQ-ACK corresponding to a cell (or CC (Component Carrier)): this represents an ACK/NACK response to downlink transmission scheduled for the corresponding cell.

PDSCH: this includes a PDSCH corresponding to a DL grant PDCCH and an SPS (Semi-Persistent Scheduling) PDSCH. The PDSCH can be replaced by a transport block or a codeword.

SPS PDSCH: this refers to a PDSCH transmitted using a resource semi-statically set according to SPS. The SPS PDSCH has no DL grant PDCCH corresponding thereto. The SPS PDSCH is used interchangeably with a PDSCH w/o (without) PDCCH.

SPS release PDCCH: this refers to a PDCCH indicating SPS release. A UE feeds back ACK/NACK information about an SPS release PDCCH.

Figure 1A:
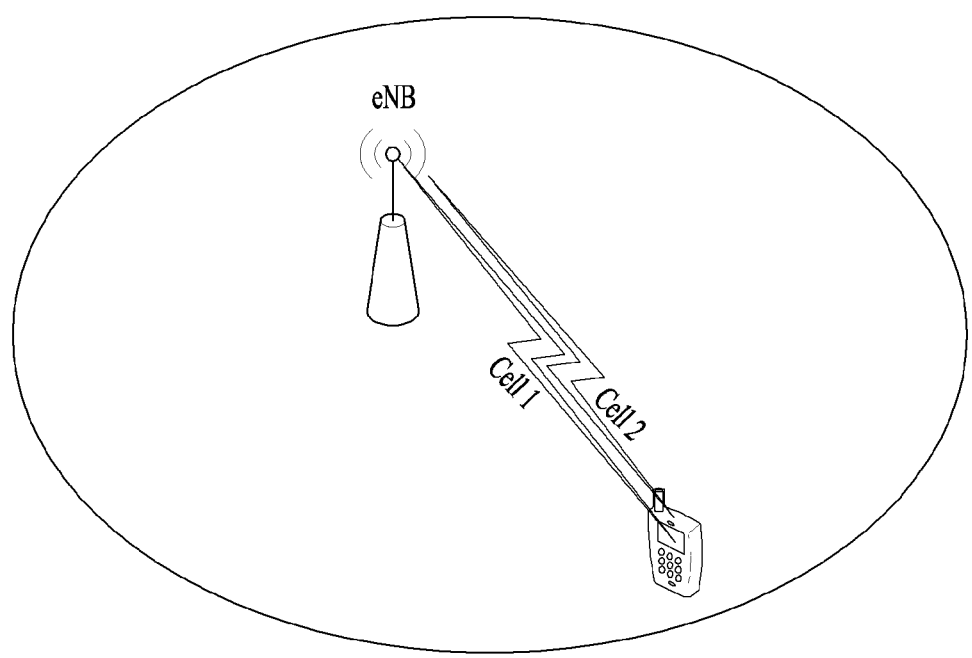
FIGS. 1A and 1B illustrate a carrier aggregation (CA)-based wireless communication system.
Figure 1B:
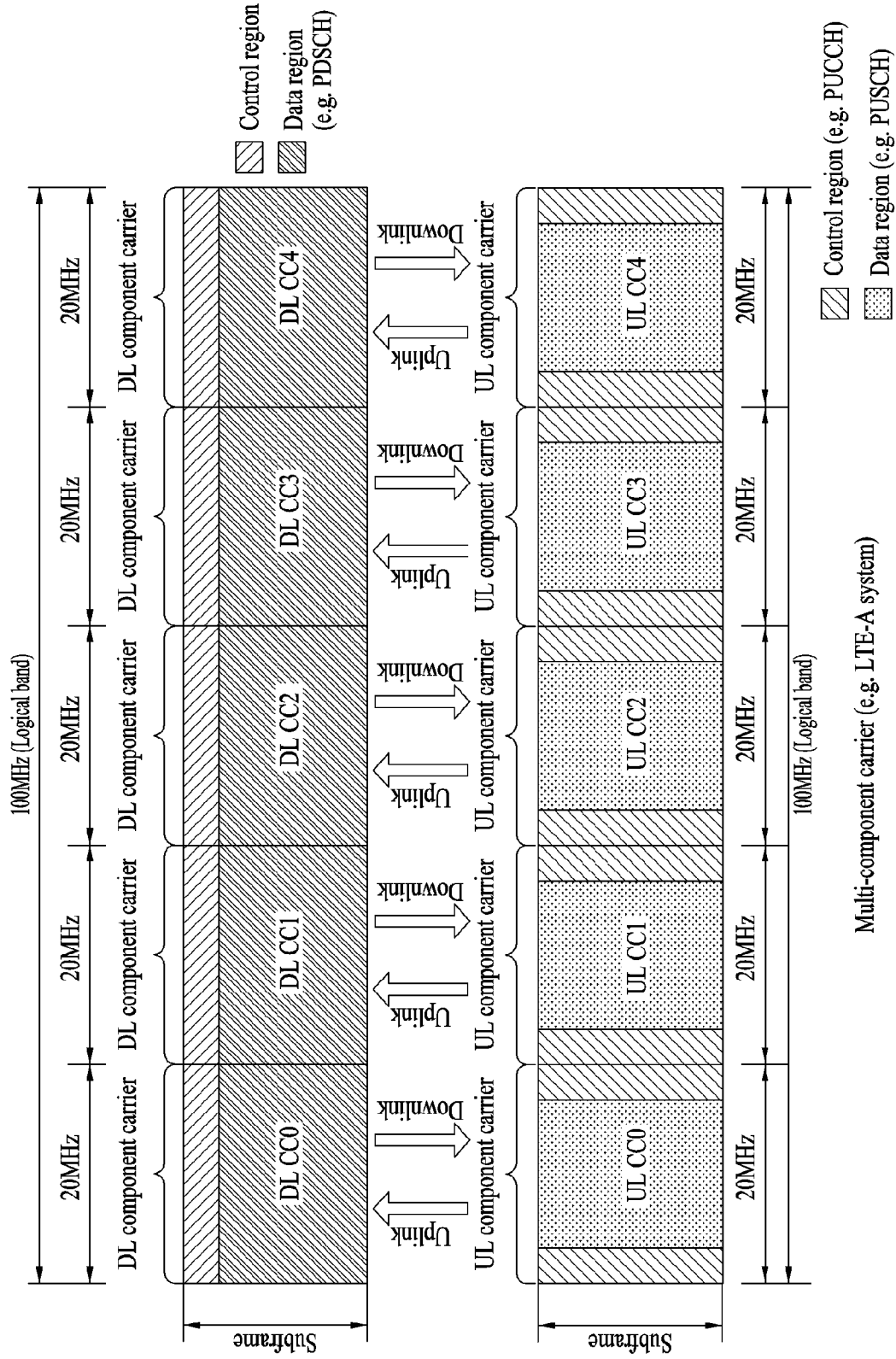

FIGS. 1A and 1B illustrate a conventional carrier aggregation (CA)-based wireless communication system. LTE supports only one DL/UL frequency block, whereas LTE-A provides a wider frequency band by aggregating a plurality of UL/DL frequency blocks. Each frequency block is transmitted using a component carrier (CC). A CC refers to a carrier frequency (or center carrier or center frequency) of a frequency block.

Referring to FIGS. 1A and 1B, a plurality of DL/UL CCs managed by one eNB can be aggregated for one UE. CCs may be contiguous or non-contiguous. The bandwidth of each CC can be independently determined. Asymmetrical carrier aggregation in which the number of UL CCs differs from the number of DL CCs is possible. Even when the entire system bandwidth corresponds to N CCs, a frequency band that can be used by a specific UE can be limited to L (<N) CCs. Various parameters with respect to carrier aggregation can be set cell-specifically, UE group-specifically or UE-specifically. Control information can be set such that the control information is transmitted and received only through a specific CC. Such specific CC may be referred to as a primary CC (PCC) (or anchor CC) and the remaining CCs may be referred to as secondary CCs (SCCs). Since UCI is transmitted only on the PCC, a plurality of PUCCHs is not transmitted through a plurality of UL CCs and transmission of a plurality of PUCCHs on the PCC is not permitted for UE power management. Accordingly, only one PUCCH can be transmitted in one UL subframe in a conventional CA system.

LTE(-A) uses the concept of the cell for radio resource management. The cell is defined as a combination of DL resources and UL resources. The UL resources are not mandatory. Accordingly, the cell can be composed of DL resources only or DL resources and UL resources. When carrier aggregation is supported, linkage between a carrier frequency of a DL resource (or DL CC) and a carrier frequency of a UL resource (or UL CC) can be indicated by system information. A cell operating at a primary frequency (or on a PCC) may be referred to as a primary cell (PCell) and a cell operating at a secondary frequency (or on an SCC) may be referred to as a secondary cell (SCell). The PCell is used to perform initial radio resource control connection establishment or RRC connection reconfiguration. The PCell may refer to a cell indicated during a handover procedure. The SCell can be configured after RRC (Radio Resource Control) connection is established between an eNB and a UE and used to provide additional radio resources. The PCell and the SCell may be commonly called a serving cell.

Unless separately mentioned, the following description may be applied to each of a plurality of aggregated CCs (or cells). In addition, a CC in the following description may be replaced with a serving CC, serving carrier, cell, serving cell, etc.

Figure 2:
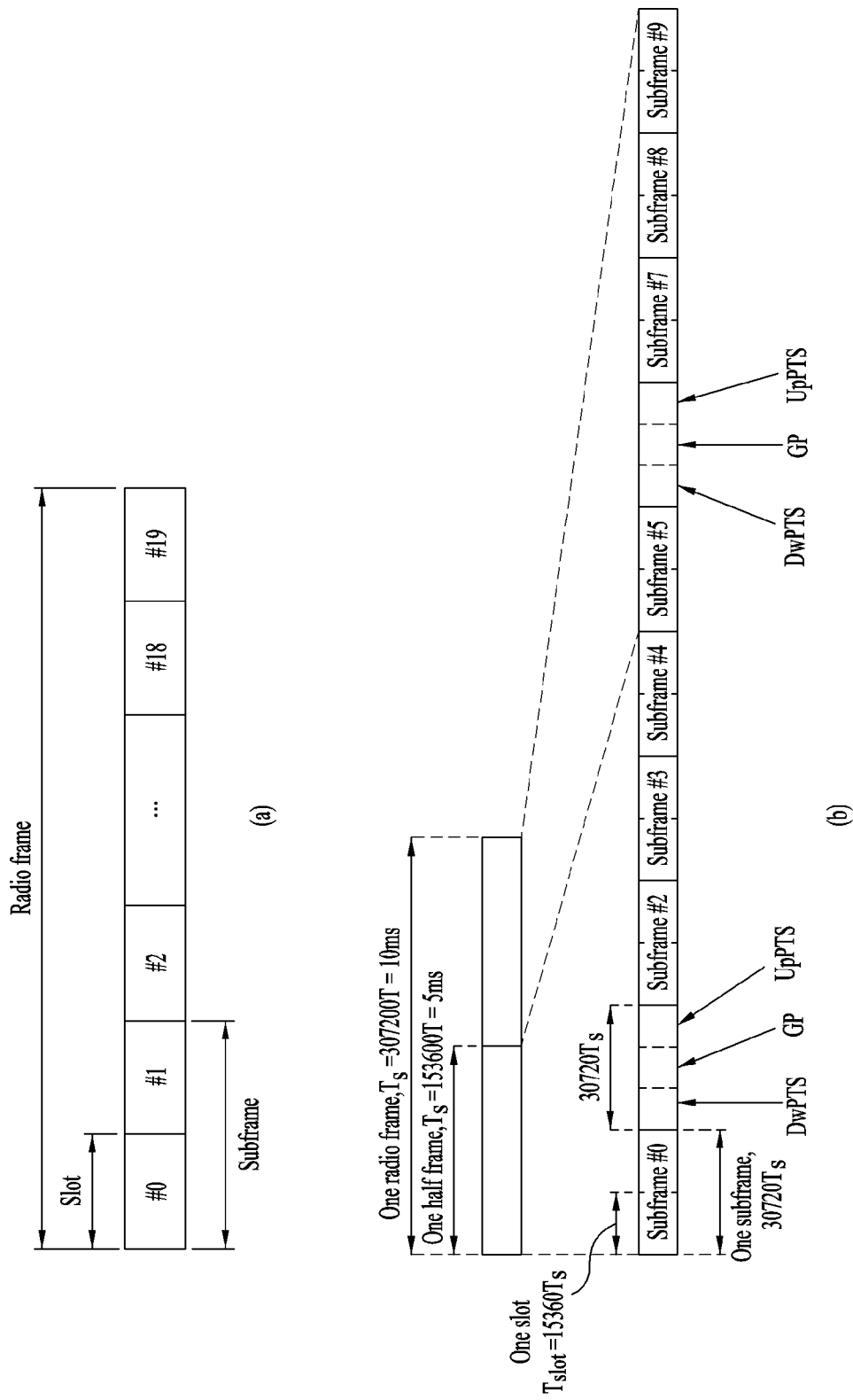
FIG. 2 illustrates the structure of a radio frame.

FIG. 2 illustrates the structure of a radio frame.

FIG. 2(a) illustrates the structure of a type-1 radio frame for frequency division duplex (FDD). A radio frame includes a plurality of (e.g., 10) subframes, and each subframe includes a plurality of (e.g., 2) slots in the time domain. Each subframe may have a length of 1 ms and each slot may have a length of 0.5 ms. A slot includes a plurality of OFDM/SC-FDMA symbols in the time domain and includes a plurality of resource blocks (RBs) in the frequency domain.

FIG. 2(b) illustrates the structure of a type-2 radio frame for time division duplex (TDD). The type-2 radio frame includes 2 half frames, and each half frame includes 5 subframes. One subframe includes 2 slots.

Table 1 shows uplink-downlink configurations (UL-DL Cfgs) of subframes in a radio frame in a TDD mode. UD-cfg is signaled through system information (e.g., a system information block (SIB)). For convenience, UD-cfg, which is set through the SIB for a TDD cell, is referred to as SIB-cfg.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes a downlink pilot time slot (DwPTS), a guard period (GP), and an uplink pilot time slot (UpPTS). The DwPTS is a time period reserved for downlink transmission and the UpPTS is a time period reserved for uplink transmission.

Figure 3:
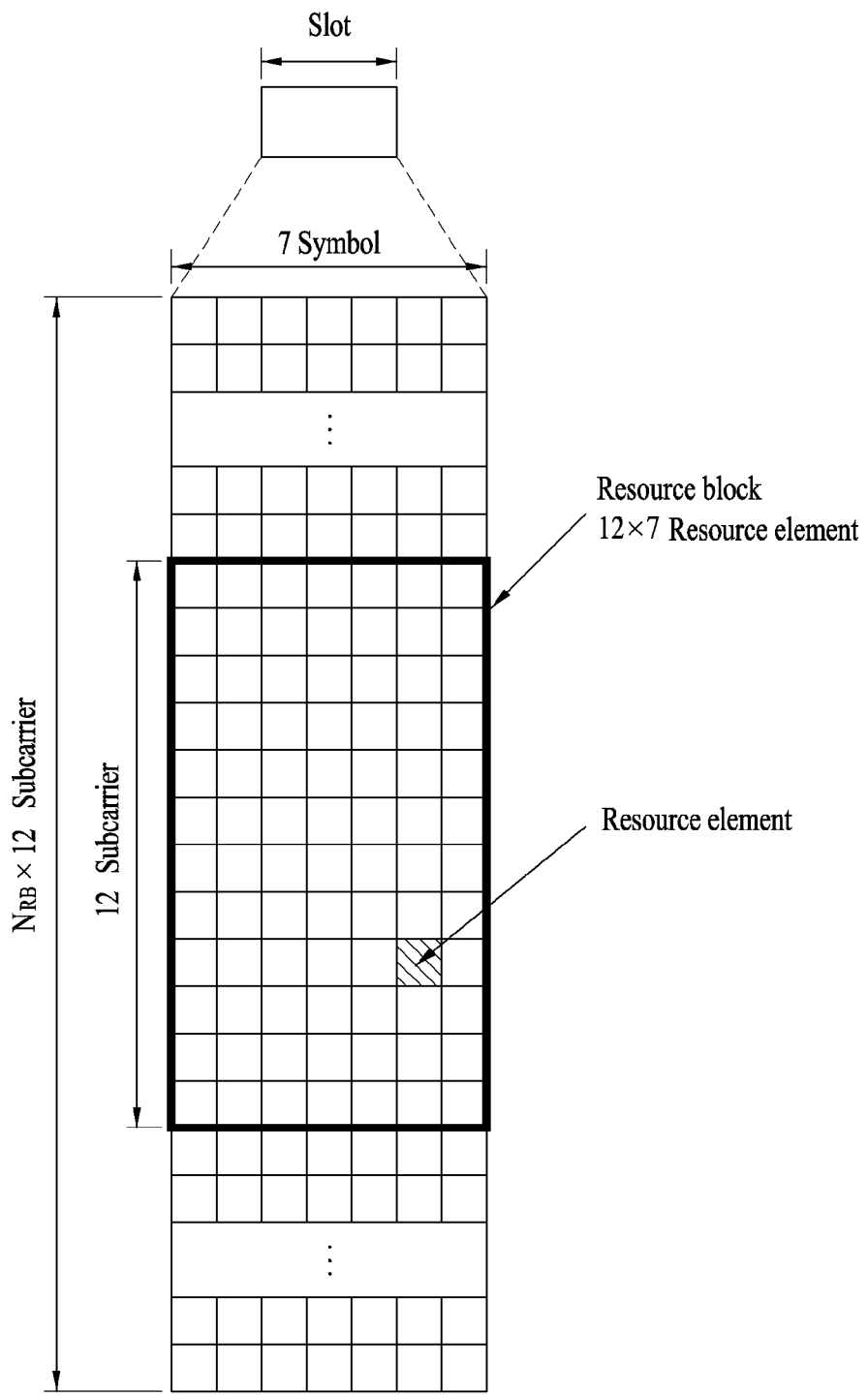
FIG. 3 illustrates a resource grid of a downlink (DL) slot.

FIG. 3 illustrates a resource grid of a DL slot.

Referring to FIG. 3, a DL slot includes a plurality of OFDMA (or OFDM) symbols in the time domain. One DL slot may include 7(6) OFDMA symbols, and one resource block (RB) may include 12 subcarriers in the frequency domain. Each element on the resource grid is referred to as a resource element (RE). One RB includes 12×7(6) REs. The number $N^{RB}$ of RBs included in the DL slot depends on a downlink transmit bandwidth. The structure of a UL slot may be same as that of the DL slot except that OFDMA symbols are replaced by SC-FDMA symbols.

Figure 4:
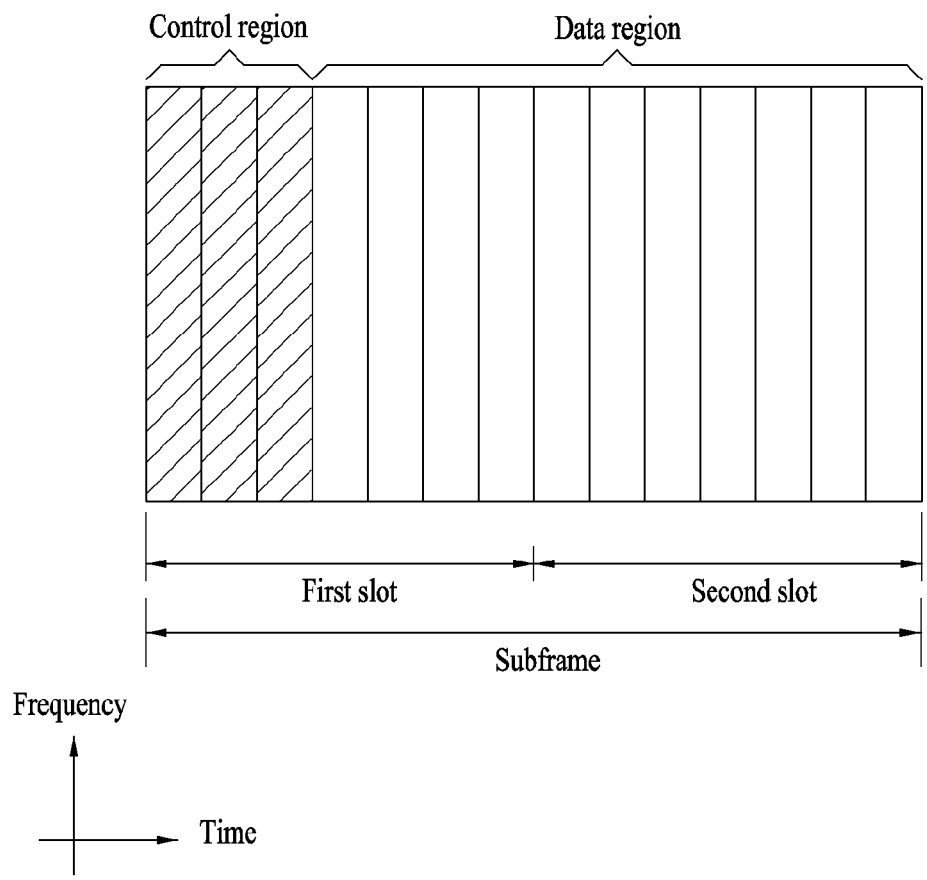
FIG. 4 illustrates the structure of a DL subframe.

FIG. 4 illustrates the structure of a DL subframe.

Referring to FIG. 4, up to 3(4) OFDMA symbols located in a front portion of a first slot within a subframe correspond to a control region to which a control channel is allocated. The remaining OFDMA symbols correspond to a data region to which a physical downlink shared chancel (PDSCH) is allocated. Examples of downlink control channels include a physical control format indicator channel (PCFICH), a physical downlink control channel (PDCCH), a physical HARQ indicator channel (PHICH), etc. The PCFICH is transmitted at a first OFDM symbol of a subframe and carries information regarding the number of OFDMA symbols used for transmission of control channels within the subframe. The PHICH is a response to uplink transmission and carries a HARQ acknowledgement (ACK)/negative acknowledgement (NACK) signal.

A PDCCH may carry a transmission format and resource allocation information of a downlink shared channel (DL-SCH), a transmission format and resource allocation information of an uplink shared channel (UL-SCH), paging information on a paging channel (PCH), system information on the DL-SCH, resource allocation information of an upper-layer control message such as a random access response transmitted on the PDSCH, a set of Tx power control commands on individual UEs within an arbitrary UE group, a Tx power control command, information on activation of a voice over IP (VoIP), etc.

Downlink control information (DCI) is transmitted on a PDCCH. DCI formats 0/4 (hereinafter referred to as UL DCI formats) is defined for UL scheduling (or UL grant), and DCI format 1/1A/1B/1C/1D/2/2A/2B/2C (hereinafter referred to as DL DCI format) is defined for DL scheduling. The DCI format selectively includes information such as hopping flag, RB allocation information, modulation coding scheme (MCS), redundancy version (RV), new data indicator (NDI), transmit power control (TPC), demodulation reference signal (DMRS) cyclic shift, depending on its use. In addition, DCI formats 3/3A (referred to as TPC DCI formats hereinafter) are defined for uplink signal power control. The TPC DCI formats include bitmap information for a plurality of UEs, and 2-bit information (DCI format 3) or 1-bit information (DCI format 3A) in a bitmap indicates a TPC command for a PUCCH and a PUSCH of a corresponding UE.

A plurality of PDCCHs may be transmitted within a control region. A UE may monitor the PDCCHs in every subframe to check a PDCCH designated to the UE. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A PDCCH coding rate may be controlled according to the number of CCEs (i.e., CCE aggregation level) used for PDCCH transmission. The CCE includes a plurality of resource element groups (REGs). A format of the PDCCH and the number of PDCCH bits are determined according to the number of CCEs. A BS determines a PDCCH format according to DCI to be transmitted to the UE, and attaches a cyclic redundancy check (CRC) to control information. The CRC is masked with an identifier (e.g., radio network temporary identifier (RNTI)) according to an owner or usage of the PDCCH. If the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
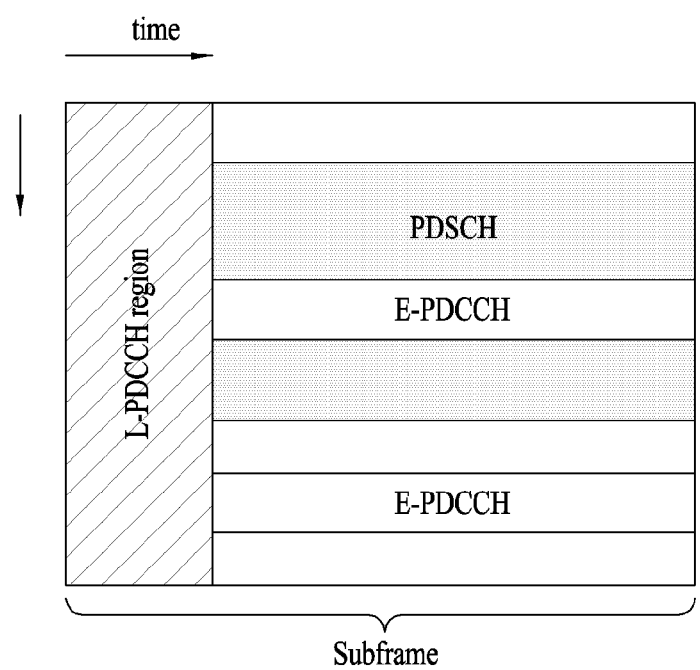
FIG. 5 illustrates an example of Enhanced Physical Downlink Control Channel (EPDCCH).

FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type.

Then, a description is now given of scheduling when a plurality of CCs (or cells) are configured. If a plurality of CCs are configured, cross-carrier scheduling scheme and non-cross-carrier scheduling (or self scheduling) scheme may be used. The non-cross-carrier scheduling (or self scheduling) scheme is the same as the legacy LTE scheduling scheme.

If cross-carrier scheduling is configured, a DL grant PDCCH may be transmitted in DL CC#0, and a corresponding PDSCH may be transmitted in DL CC#2. Likewise, a UL grant PDCCH may be transmitted in DL CC#0, and a corresponding physical uplink shared channel (PUSCH) may be transmitted in UL CC#4. For cross-carrier scheduling, a carrier indicator field (CIF) is used. Whether a CIF is present in a PDCCH may be determined through higher layer signaling (e.g., RRC signaling) using semi-static and UE-specific (or UE-group-specific) schemes.

Scheduling according to whether a CIF is set may be defined as described below.
CIF disabled: A PDCCH in a DL CC allocates PDSCH resources in the same DL CC or allocates PUSCH resources in one linked UL CC.
CIF enabled: A PDCCH in a DL CC may allocate PDSCH or PUSCH resources in a specific DL/UL CC among a plurality of aggregated DL/UL CCs, using a CIF.

When a CIF is present, a BS may allocate one or more PDCCH monitoring DL CCs (hereinafter referred to as monitoring CCs (MCCs)) to a UE. The UE may detect/decode a PDCCH in the MCCs. That is, if the BS schedules a PDSCH/PUSCH to the UE, a PDCCH is transmitted only in the MCCs. The MCCs may be set using UE-specific, UE-group-specific, or cell-specific scheme. The MCCs include a PCC.

Figure 6:
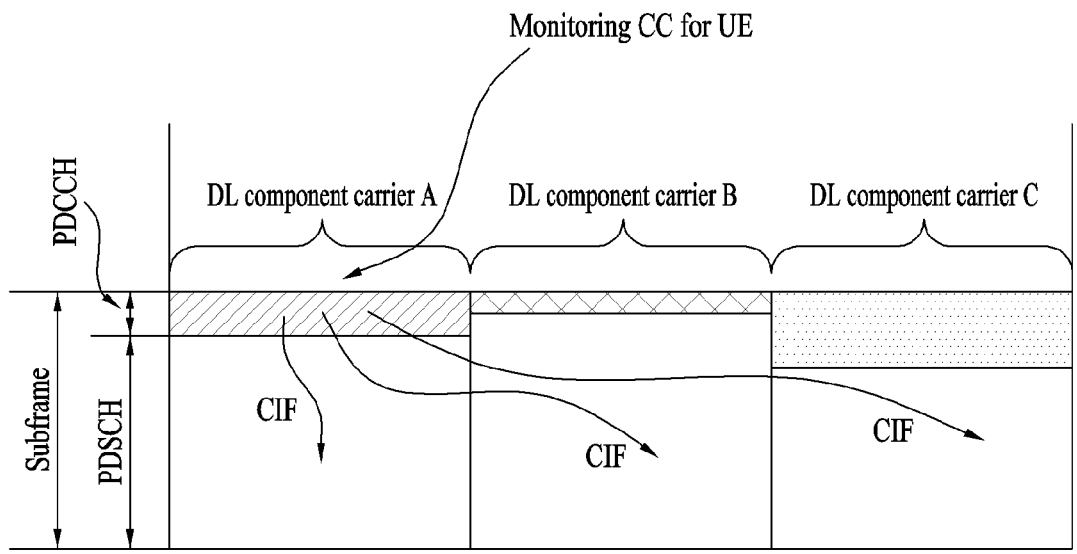
FIG. 6 illustrates a scheduling method when a plurality of cells is configured.

FIG. 6 illustrates cross-carrier scheduling. Although DL scheduling is illustrated in FIG. 5, the illustrated scheme is equally applied to UL scheduling.

Referring to FIG. 6, 3 DL CCs may be configured for a UE, and DL CC A may be set as a PDCCH monitoring DL CC (i.e., MCC). If a CIF is disabled, each DL CC may transmit a PDCCH for scheduling its PDSCH without the CIF according to the LTE PDCCH rules. On the other hand, if a CIF is enabled, DL CC A (i.e., MCC) may transmit not only a PDCCH for scheduling its PDSCH but also PDCCHs for scheduling PDSCHs of other CCs, using the CIF. In this example, DL CC B/C transmits no PDCCH.

Figure 7:
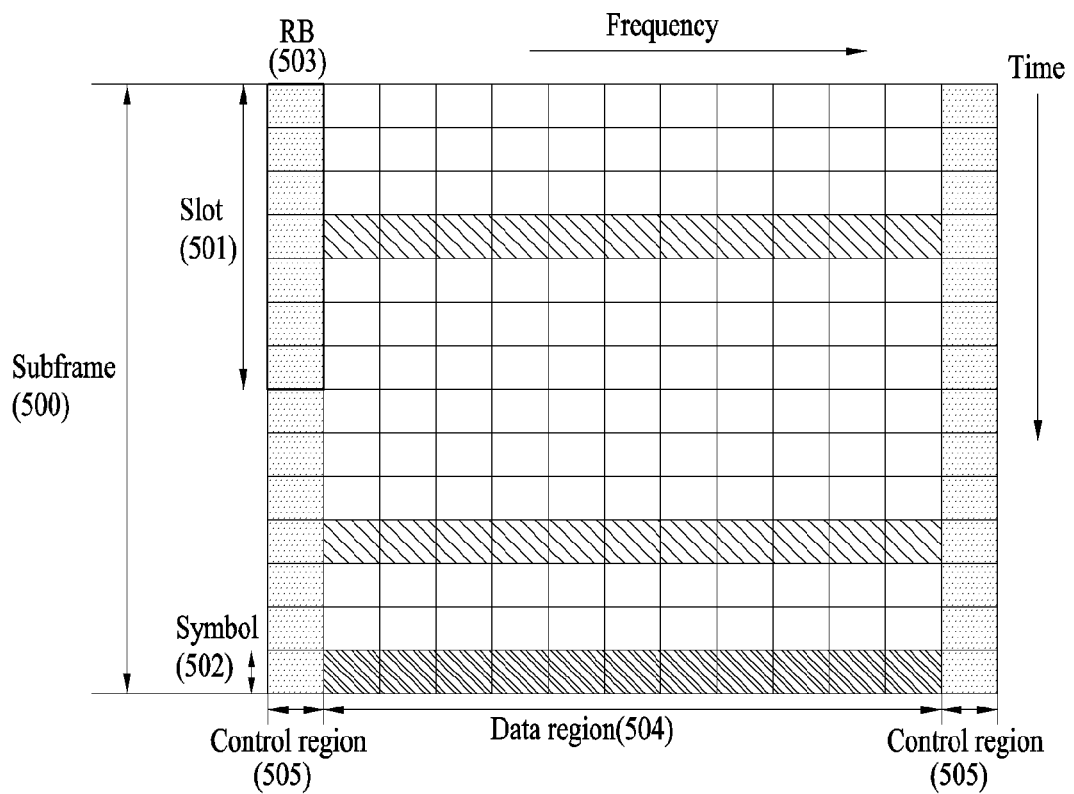
FIG. 7 illustrates the structure of an uplink subframe.

FIG. 7 is a diagram showing the structure of an uplink subframe.

Referring to FIG. 7, a subframe having a length of 1 ms includes two of slots each having a length of 0.5 ms. The slot may include SC-FDMA symbols, the number of which is changed according to CP length. For example, the slot includes seven SC-FDMA symbols in a normal CP case and includes six SC-FDMA symbols in an extended CP case. A resource block 503 is a resource allocation unit corresponding to 12 subcarriers in a frequency domain and one slot in a time domain. The structure of the uplink subframe may be divided into a control region 504 and a data region 505. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary. An SRS (Sounding Reference Signal) is transmitted on the last SC-FDMA symbol of a subframe. The SRS may be transmitted periodically or aperiodically at the request of an eNB. Periodic SRS transmission is defined by a cell-specific parameter and a UE-specific parameter. The cell-specific parameter indicates all subframe sets (referred to as cell-specific SRS subframe sets hereinafter) in which the SRS can be transmitted in a cell and the UE-specific parameter indicates a subframe subset (referred to as a UE-specific SRS subframe set hereinafter) that is actually allocated to a UE within all subframe sets.

The PUCCH can be used to transmit the following control information.
SR (scheduling request): This is information used to request UL-SCH resources and is transmitted using on-off keying (OOK) scheme.
HARQ-ACK: This is a response signal to a downlink signal (e.g., PDSCH, SPS release PDCCH). For example, 1-bit ACK/NACK is transmitted as a response to one DL codeword and 2-bit ACK/NACK is transmitted as a response to two DL codewords.

CSI (Channel Status Information): This is feedback information on a DL channel and includes channel quality information (CQI), rank indicator (RI), precoding matrix indicator (PMI), precoding type indicator (PTI), etc. Here, the CSI refers to periodic CSI (p-CSI). Aperiodic CSI (aperiodic CSI (a-CSI)) transmitted at the request of an eNB is transmitted on a PUSCH.

Table 2 shows the mapping relationship between a PUCCH format (PF) and UCI in LTE(-A).

TABLE 2

| PUCCH format | Uplink Control Information (UCI) |
| --- | --- |
| Format 1 | SR (scheduling request) (unmodulated waveform) |
| Format 1a | 1-bit HARQ-ACK/NACK (with/without SR) |
| Format 1b | 2-bit HARQ-ACK/NACK (with/without SR) |
| Format 2 | CSI (20 coded bits) |
| Format 2 | CSI and 1-bit or 2-bit HARQ-ACK/NACK (20 bits) (for extended CP only) |
| Format 2a | CSI and 1-bit HARQ-ACK/NACK (20 + 1 coded bits) |
| Format 2b | CSI and 2-bit HARQ-ACK/NACK (20 + 2 coded bits) |
| Format 3 (LTE-A) | Up to 24 bits of HARQ-ACK/NACK + SR |

Figure 8:
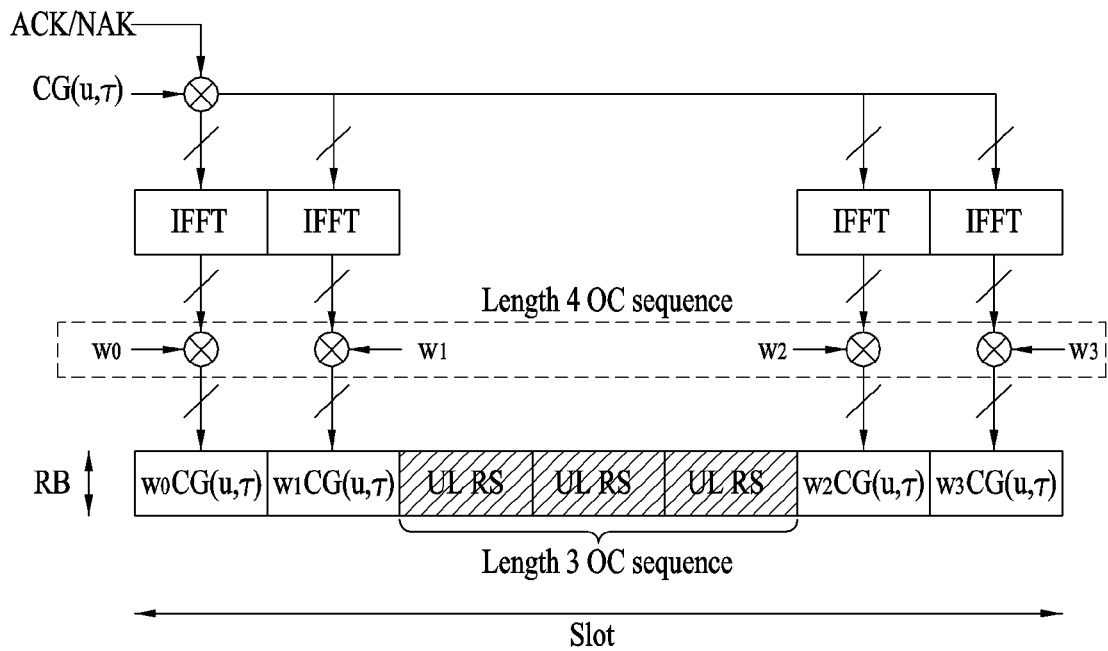
FIG. 8 illustrates the structures of physical uplink control channel (PUCCH) formats 1a and 1b in a slot level.

FIG. 8 illustrates the structures of PUCCH formats 1a and 1b in a slot level. In PUCCH formats 1a and 1b, the same control information is repeated on a slot basis in a subframe. Each UE transmits an ACK/NACK signal in different resources configured by a different cyclic shift (CS) (frequency-domain code) and a different orthogonal cover code (OCC) (time-domain spreading code) of a computer-generated constant amplitude zero auto correlation (CG-CAZAC) sequence. An OCC includes a Walsh/DFT orthogonal code. If the number of CSs is 6 and the number of OCs is 3, ACK/NACK signals of 18 UEs may be multiplexed into the same physical resource block (PRB). In PUCCH format 1, ACK/NACK in PUCCH format 1a/1 is replaced by an SR.

Figure 9:
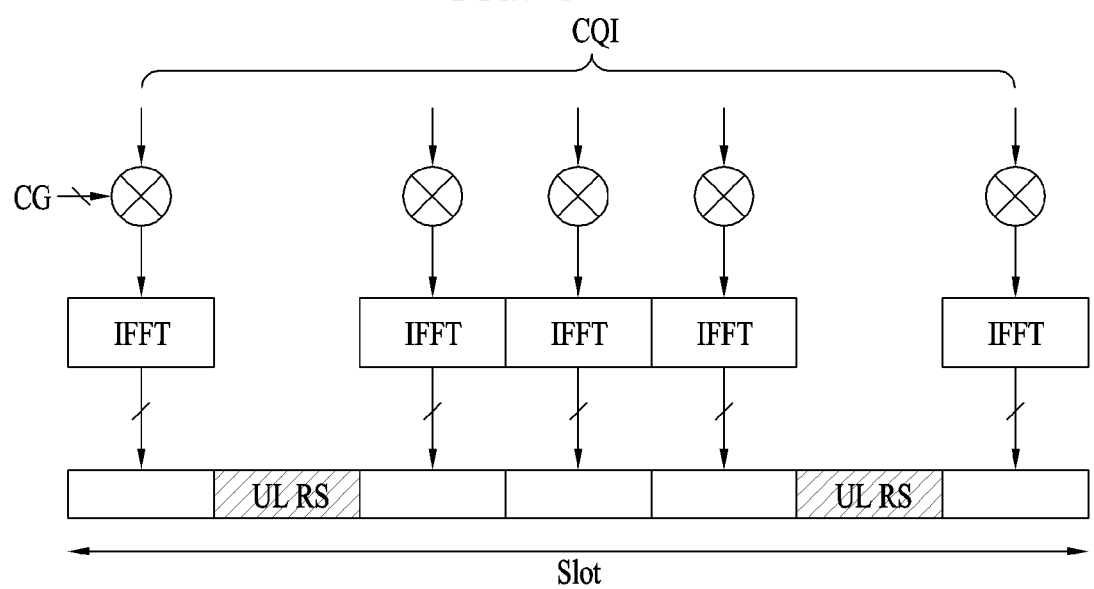
FIG. 9 is a diagram showing a slot level structure of PUCCH format 2.

FIG. 9 is a diagram showing PUCCH format 2.

Referring to FIG. 9, if a normal CP is configured, PUCCH format 2/2a/2b includes five QPSK data symbols and two RS symbols at a slot level. If an extended CP is configured, PUCCH format 2/2a/2b includes five QPSK data symbols and one RS symbol at a slot level. If an extended CP is configured, an RS symbol is located at a fourth SC-FDMA symbol of each slot. Accordingly, PUCCH format 2/2a/2b may carry a total of 10 QPSK data symbols. Each QPSK symbol is spread in the frequency domain by a CS and then is mapped to an SC-FDMA symbol. The RS may be multiplexed by code division multiplexing (CDM) using a CS. It may be necessary to transmit A/N and CSI in the same subframe. In this case, when a higher layer sets non-permission of simultaneous transmission of A/N and CSI ("Simultaneous-A/N-and-CQI" parameter=OFF), only A/N transmission is performed using PUCCH format 1a/1b and CSI transmission is dropped. Conversely, when permission of simultaneous transmission of A/N and CSI is set ("Simultaneous-AN-and-CQI" parameter=ON), A/N and CSI are transmitted together through PUCCH format 2/2a/2b. Specifically, in a normal CP case, A/N is embedded in the second RS of each slot (e.g., A/N is multiplied by the RS) in PUCCH format 2a/2b. In an extended CP case, A/N and CSI are joint-coded and then transmitted through PUCCH format 2.

Figure 10:
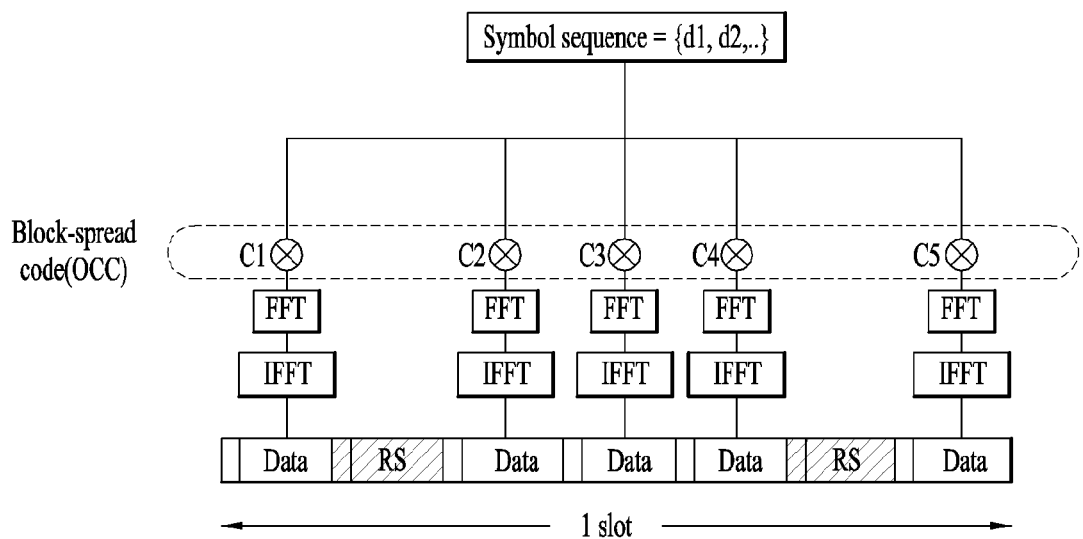
FIG. 10 illustrates the structure of PUCCH format 3 in a slot level.

FIG. 10 illustrates the structure of PUCCH format 3 in a slot level. PUCCH format 3 is used to transmit a plurality of ACK/NACK information, and information such as CSI and/or SR may be transmitted together.

Referring to FIG. 10, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, ... } using a length-5 OCC. Here, the symbol sequence {d1, d2, ... } may be a modulation symbol sequence or a codeword bit sequence. The symbol sequence {d1, d2, ... } may be generated by performing joint coding (e.g., Reed-Muller coding, tail-biting convolutional coding, etc.), block-spreading, and SC-FDMA modulation on a plurality of ACK/NACK information.

Figure 11:
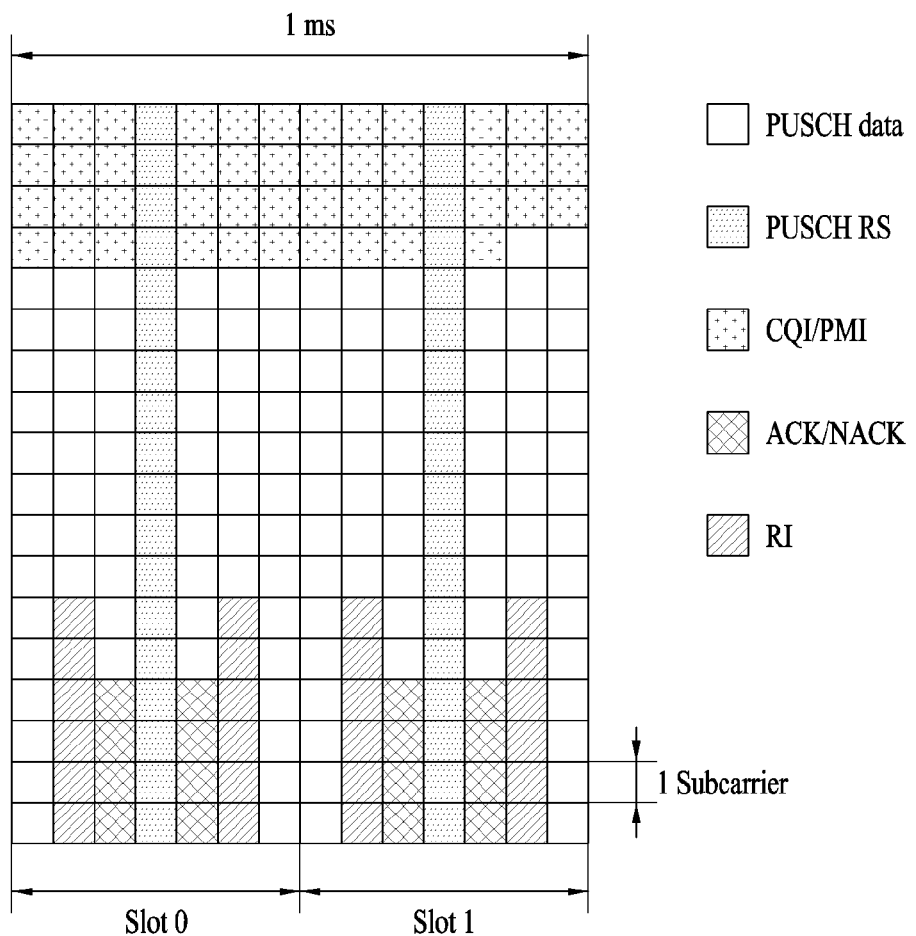
FIG. 11 illustrates a method for transmitting uplink control information (UCI) on a physical uplink shared channel (PUSCH).

FIG. 11 illustrates a method for transmitting UCI on a PUSCH. A subframe which requires UCI transmission has PUSCH assignment, UCI may be transmitted on a PUSCH (PUSCH piggyback). Specifically, for piggybacking of CSI/PMI and RI, PUSCH data (i.e., UL-SCH data) information (e.g, coded symbol) is rate-matched in consideration of the quantity of the CSI/PMI and RI. Meanwhile, ACK/NACK is inserted into part of SC-FMDA resources to which the UL-SCH data is mapped through puncturing. In addition, UCI can be scheduled to be transmitted on a PUSCH without the UL-SCH data.

When a UE needs to transmit a PUCCH in a cell-specific SRS subframe set, the UE does not use the last SC-FDMA symbol of the second slot to transmit the PUCCH in order to protect the SRS thereof/SRSs of other UEs. For convenience, a PUCCH format in which all SC-FDMA symbols of a subframe are used for PUCCH transmission is referred to as a normal PUCCH format and a PUCCH format in which the last SC-FDMA symbol of the second slot is not used for PUCCH transmission is referred to as a shortened PUCCH format. For the same reason, when a PUSCH is allocated to a cell-specific SRS subframe, each UE does not use the last SC-FDMA symbol of the second slot for PUSCH transmission. Specifically, PUSCH data (i.e. UL-SCH data) information (e.g., coded symbol) is rate-matching in consideration of the quantity of resource of the last SC-FDMA symbol. For convenience, a PUSCH, which is transmitted using all SC-FDMA symbols of a subframe, is referred to as a normal PUSCH and a PUSCH, which is transmitted without using the last SC-FDMA symbol of the second slot, is referred to as a rate-matched PUSCH.

A description is now given of an ACK/NACK transmission procedure in a TDD-configured CC (or cell) and a signal transmission timing thereof with reference to FIGS. 12 to 17. FIGS. 12 to 17 illustrate the ACK/NACK transmission procedure and the signal transmission timing thereof on the basis of a TDD CC (or cell) and timing for an FDD CC (or cell) will be additionally described.

Figure 12:
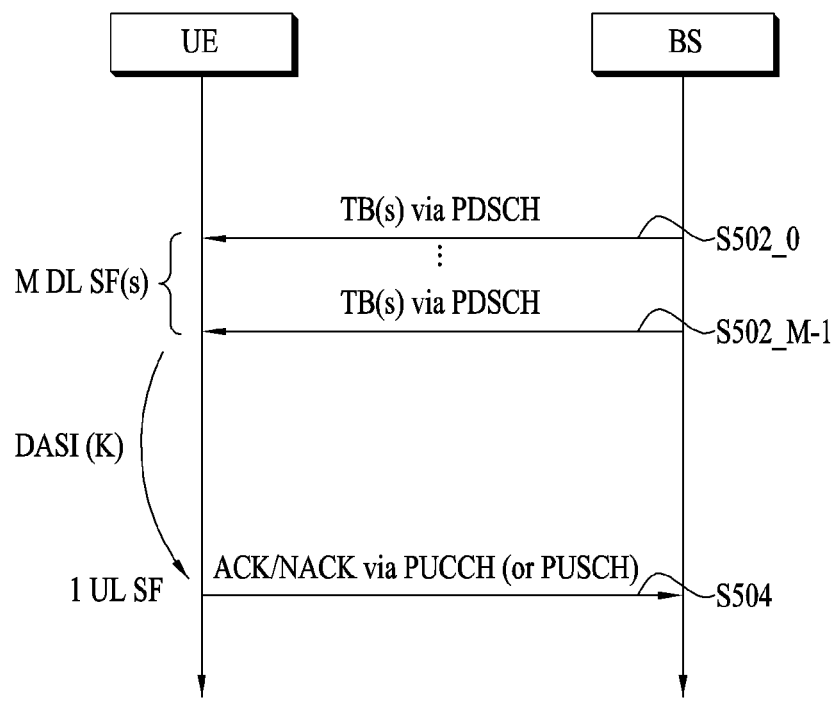
FIGS. 12 and 13 illustrate UL acknowledgement (ACK)/negative acknowledgement (NACK) timing of a time division duplex (TDD) cell.
Figure 13:
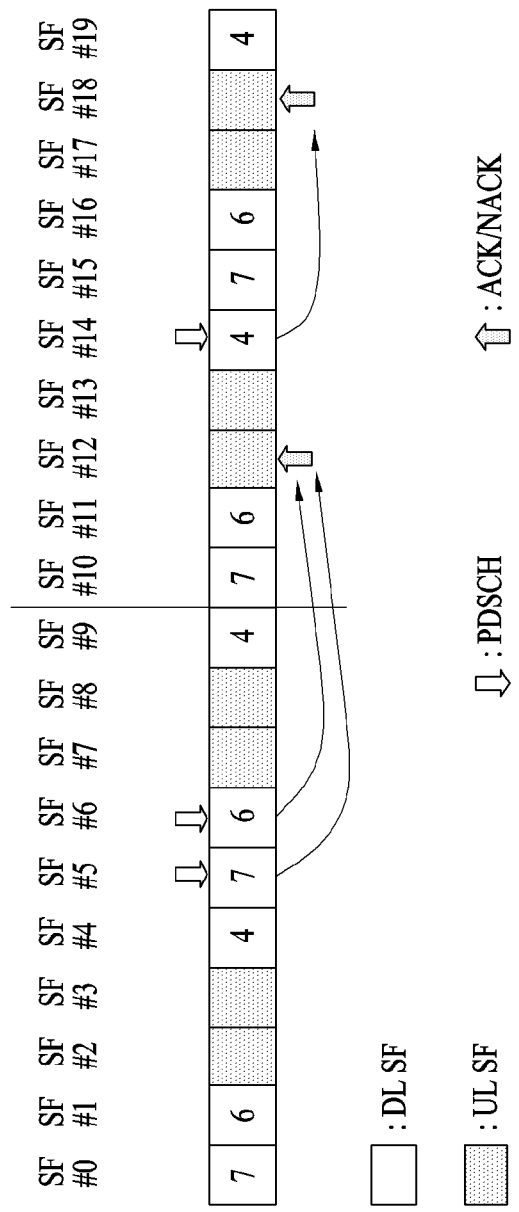

FIGS. 12 and 13 illustrate ACK/NACK (A/N) timing (or HARQ timing).

Referring to FIG. 12, a UE may receive one or more PDSCH signals in M DL subframes (SFs) (S502_0 to S502_M−1) (M≥1). Each PDSCH signal may include one or more (e.g., 2) transport blocks (TBs) according to a transmission mode. Although not shown in FIG. 10, a PDCCH signal indicating SPS release may also be received in steps S502_0 to S502M−1. When a PDSCH signal and/or SPS release PDCCH signal are present in the M DL subframes, the UE transmits an ACK/NACK in one UL subframe corresponding to the M DL subframes through a procedure for ACK/NACK transmission (e.g. ACK/NACK (payload) generation, ACK/NACK resource allocation, etc.) (S504).

The ACK/NACK includes acknowledgement information on the PDSCH signal and/or SPS release PDCCH signal of steps S502_0 to S502_M-1. Although the ACK/NACK is basically transmitted on a PUCCH, if there is PUSCH transmission at ACK/NACK transmission timing, the ACK/NACK is transmitted on a PUSCH. If a plurality of CCs is configured for the UE, the PUCCH is transmitted only in a PCC, and the PUSCH is transmitted in a scheduled CC. A variety of PUCCH formats shown in Table 2 may be used for ACK/NACK transmission. Furthermore, a variety of schemes such as ACK/NACK bundling, ACK/NACK channel selection (CHSel), etc. may be used to reduce the number of ACK/NACK bits to be transmitted.

M=1 in FDD and M is an integer equal to or greater than 1 in TDD. In TDD, the relationship between M DL subframes and UL subframes in which A/N transmitted is determined by a DASI (Downlink Association Set Index).

Table 3 shows a DASI (K: $\{k_0, k_1, \ldots k_{M-1}\}$) defined in LTE(-A). When a PDCCH that indicates PDSCH transmission and/or SPS (Semi-Persistent Scheduling) release is present in subframe n−k (k∈K), a UE transmits ACK/NACK in subframe n. In FDD, DASI (for convenience, $d_F$)=4.

$$n^{(1)}_{PUCCH} = n_{CCE} + N^{(1)}_{PUCCH} \qquad \text{[Equation 1]}$$

Here, $n^{(1)}_{PUCCH}$ indicates a resource index of PF1 for ACK/NACK/DTX transmission, $N^{(1)}_{PUCCH}$ indicates a signaling value received from a higher layer (e.g., Radio Resource Control (RRC)), and $n_{CCE}$ indicates a smallest value from among CCE indices used for L-PDCCH transmission. A CS (Cyclic Shift), an OC (Orthogonal Code) and a PRB (Physical Resource Block) for PF1 are obtained from $n^{(1)}_{PUCCH}$.

When PUCCH format 3 (PF3) is set for A/N transmission, a specific PF3 resource index from among a plurality of PF3 resource indices ($n^{(3)}_{PUCCH}$) allocated by a higher layer (e.g., RRC) can be indicated by an ARI (ACK/NACK Resource Indicator) of the DL grant L-PDCCH (explicit PUCCH resource). The ARI is transmitted through a TPC field of an L-PDCCH that schedules a PDSCH of an SCell. An OC and a PRB for PF3 are obtained from $n^{(3)}_{PUCCH}$.

Even in the case of EPDCCH based scheduling, an ACK/NACK transmission resource for DL data scheduled by a DL grant EPDCCH can be determined as a PUCCH resource linked to a specific ECCE index (e.g., minimum

TABLE 3

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD operation, a UE needs to transmit one or more A/N signals for DL transmission (e.g., PDSCH), received through M DL SFs, through one UL SF. Methods for transmitting A/N for a plurality of DL SFs through one UL SF are will now be described.

1) A/N bundling: A/N bits for a plurality of data units (e.g. PDSCH, SPS release PDCCH, etc.) are combined according to a logical operation (e.g. logic-AND operation). For example, a receiving end (e.g. UE) transmits an ACK signal upon successful decoding of all data units and transmits a NACK signal or no signal upon failure of decoding (or detection) of any one of the data units.

2) Channel selection (CHsel): A UE receiving a plurality of data units (e.g. PDSCH, SPS release PDCCH, etc.) occupies a plurality of PUCCH resources for A/N transmission. A/N responses to the plurality of data units are identified by combinations of PUCCH resources used for A/N transmission and transmitted A/N (e.g. bit values and QPSK symbol values). Channel selection is also referred to as A/N selection and PUCCH selection.

A description will be given of a method for determining an ACK/NACK transmission resource in the case of L-PDCCH based scheduling. When PUCCH format 1a/1b (referred to as PF1 hereinafter) is set for A/N transmission, an ACK/NACK transmission resource scheduled by a DL grant L-PDCCH can be determined as a PUCCH resource linked to a specific ECCE index (e.g., minimum ECCE index) corresponding to an ECCE constituting the DL grant L-PDCCH (implicit PUCCH resource). Specifically, in LTE/LTE-A, a PF1 resource index is determined as follows.

ECCE index) corresponding to an ECCE constituting the DL grant EPDCCH or an ECCE index obtained by adding a specific offset value to the specific ECCE index. An ACK/NACK feedback transmission resource can be determined as a PUCCH resource linked to a specific ECCE index (e.g., minimum ECCE index) corresponding to an ECCE constituting the DL grant EPDCCH or an ECCE index obtained by adding a specific offset value to the specific ECCE index. Here, the specific offset value can be determined by a value, which is directly signaled through an ARO (ACK/NACK Resource Offset) field in the DL grant EPDCCH, and/or a value designated per AP (Antenna Port). Specifically, information signaled through the TPC field and the ARO field in the DL grant EPDCCH according to frame structure type (e.g., FDD or TDD) and feedback transmission method (e.g., PF3 or CHsel) can be configured as follows. For convenience, a TPC command for PUCCH power control is defined as "TPC value", an offset value added when an implicit PUCCH index is determined is defined as "ARO value", and an ARI that indicates a specific one of a plurality of PF3 indices or a plurality of PF1 indices (groups) allocated through RRC is defined as "ARI value". In addition, a fixed value (e.g., "0") that is inserted (for virtual CRC or the like) without containing no information is defined as "fixed value".

1) FDD with PF3
  A. TPC field
    i. DL grant that schedules a PCell: TPC value
    ii. DL grant that schedules an SCell: ARI value B. ARO field
   i. DL grant that schedules a PCell: ARO value
   ii. DL grant that schedules an SCell: fixed value
2) FDD with CHsel
  A. TPC field
   i. DL grant that schedules a PCell: TPC value
   ii. DL grant that schedules an SCell: ARI value
  B. ARO field
   i. DL grant transmitted through a PCell: ARO value
   ii. DL grant transmitted through an SCell: fixed value
3) TDD with PF3
  A. TPC field
   i. DL grant that schedules a PCell: TPC value
   ii. DL grant that schedules an SCell: ARI value
  B. ARO field
   i. DL grant that schedules a PCell and corresponds to DAI=1: ARO value
   ii. DL grant that schedules a PCell and does not correspond to DAI=1: ARI value
   iii. DL grant that schedules an SCell: fixed value
4) TDD with CHsel
  A. TPC field
   i. DL grant that schedules a PCell: TPC value
   ii. DL grant that schedules an SCell: ARI value
  B. ARO field
   i. DL grant transmitted through a PCell: ARO value
   ii. DL grant transmitted through an SCell: fixed value FIG. 13 illustrates A/N timing applied to a CC having UL-DL Cfg #1. In FIG. 11, SF#0 to SF#9, and SF#10 to SF#19 correspond to radio frames. The numeral in a box denotes a DL subframe associated with a UL subframe. For example, an ACK/NACK of a PDSCH of SF#5 is transmitted in SF#5+7 (=SF#12), and an ACK/NACK of a PDSCH of SF#6 is transmitted in SF#6+6 (=SF#12). That is, an ACK/NACK of SF#5/SF#6 is transmitted in SF#12. Likewise, an ACK/NACK of a PDSCH of SF#14 is transmitted in SF#14+4 (=SF#18).

Figure 14:
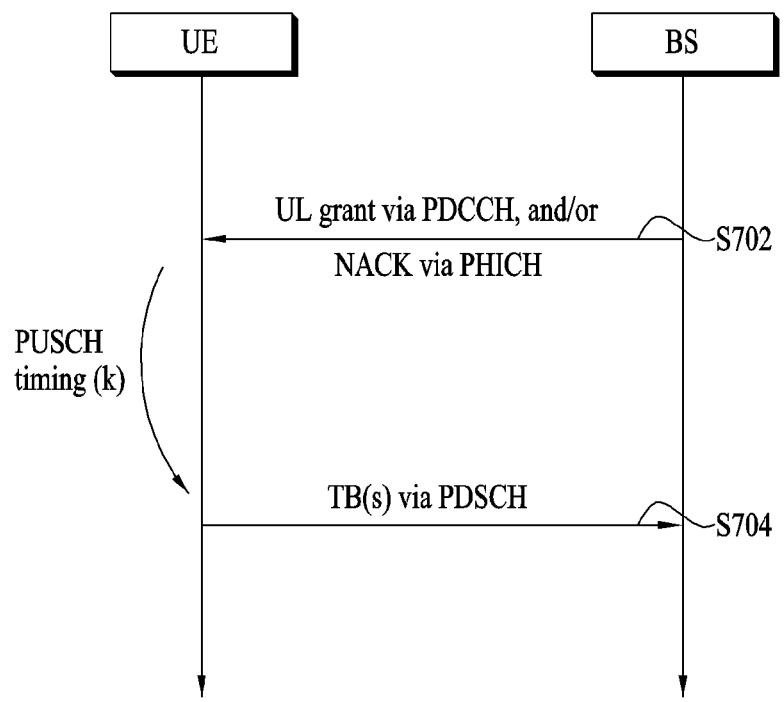
FIGS. 14 and 15 illustrate UL grant (UG)/PHICH-PUSCH timing A PUSCH may be transmitted in response to a PDCCH (UL grant) and/or PHICH (NACK).
Figure 15:
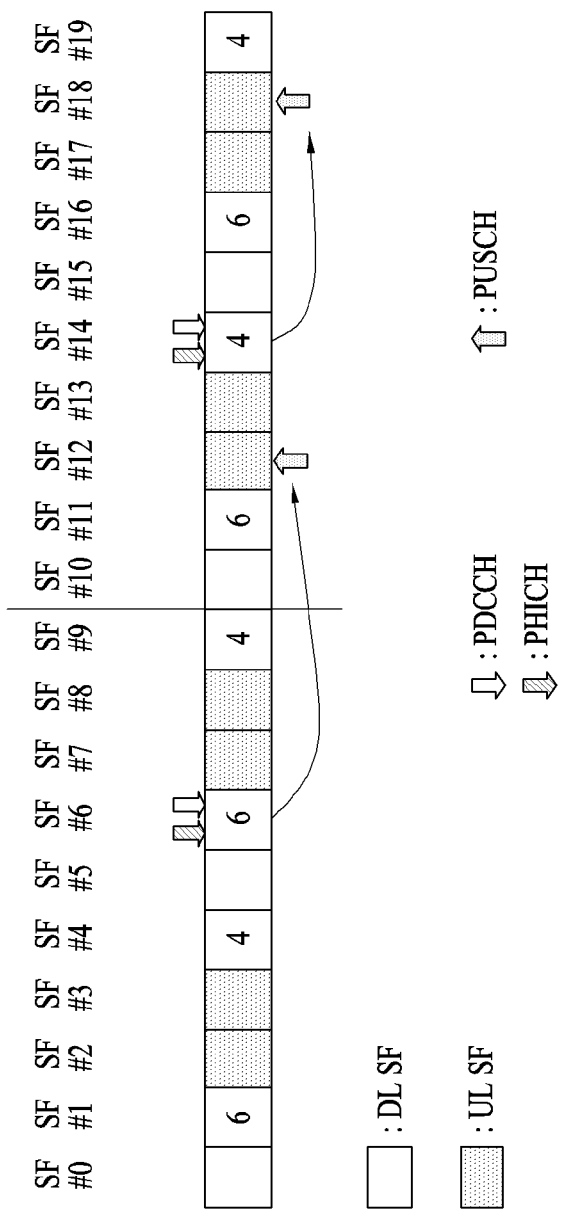

FIGS. 14 and 15 illustrate UL grant (UG)/PHICH-PUSCH timing. A PUSCH may be transmitted in response to a PDCCH (UL grant) and/or PHICH (NACK).

Referring to FIG. 14, a UE may receive a PDCCH (UL grant) and/or PHICH (NACK) (S702). Here, the NACK corresponds to an ACK/NACK response to previous PUSCH transmission. In this case, the UE may initially transmit or retransmit one or more TBs on a PUSCH after k subframes through a procedure for PUSCH transmission (e.g., TB coding, TB-CW swapping, PUSCH resource allocation, etc.) (S704). This example assumes a normal HARQ operation in which a PUSCH is transmitted once. In this case, a PHICH/UL grant corresponding to PUSCH transmission is present in the same subframe. However, in subframe bundling in which a PUSCH is transmitted a plurality of times in a plurality of subframes, a UL grant/PHICH corresponding to PUSCH transmission may be present in different subframes.

Table 4 shows an uplink association index (UAI) (k) for PUSCH transmission in LTE(-A). Table 4 shows the interval between a DL subframe in which a PHICH/UL grant is detected, and a UL subframe associated with the DL subframe. Specifically, if a PHICH/UL grant is detected in subframe n, a UE may transmit a PUSCH in subframe n+k. In FDD, UAI (i.e., k)=4.

TABLE 4

| TDD UL-DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | 4 | | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 15 illustrates PUSCH transmission timing when UL-DL Cfg #1 is set. In FIG. 15, SF#0 to SF#9, and SF#10 to SF#19 correspond to radio frames. The numeral in a box denotes a UL subframe associated with a DL subframe. For example, a PUSCH for a PHICH/UL grant of SF#6 is transmitted in SF#6+6 (=SF#12), and a PUSCH for a PHICH/UL grant of SF#14 is transmitted in SF#14+4 (=SF#18).

Figure 16:
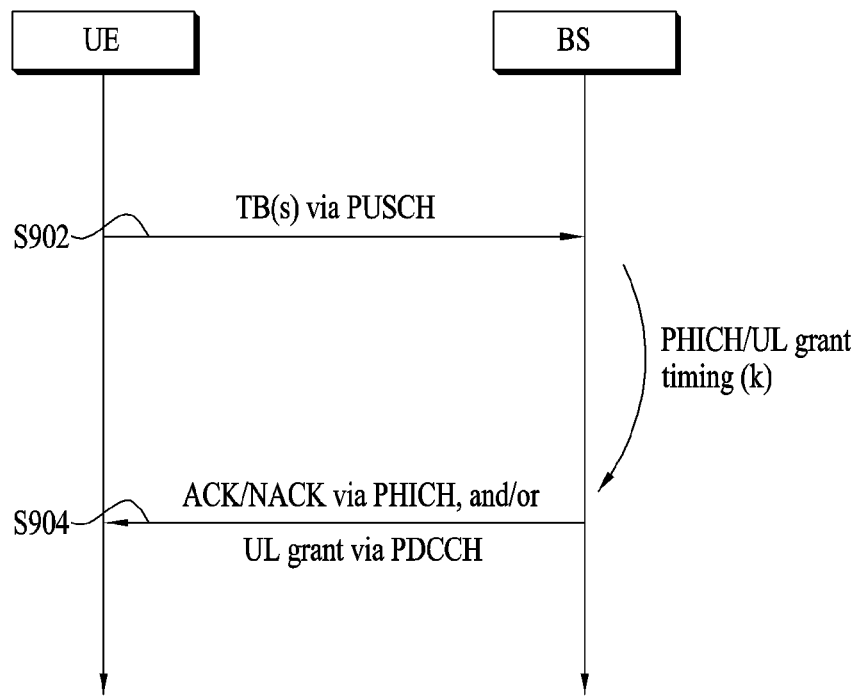
FIGS. 16 and 17 illustrate UL grant/physical hybrid automatic repeat request (HARQ) indicator channel (PHICH) transmission timing of a TDD cell.
Figure 17:
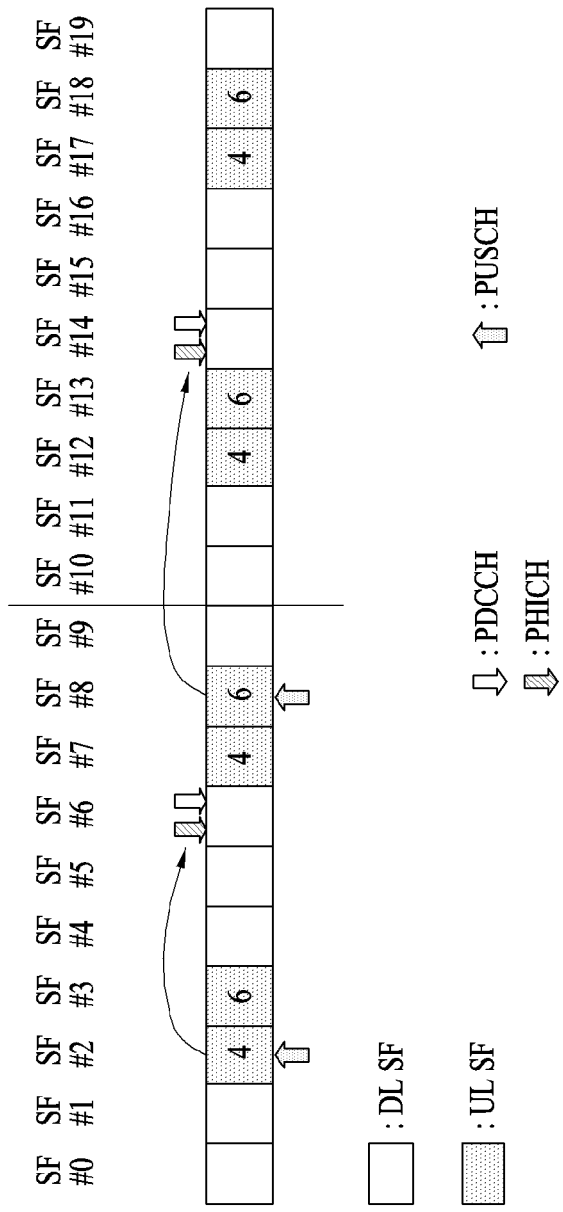

FIGS. 16 and 17 illustrate PUSCH-UL grant (UG)/PHICH timing. A PHICH is used to transmit a DL ACK/NACK. Here, the DL ACK/NACK is a response to UL data (e.g., PUSCH) and refers to an ACK/NACK transmitted in downlink.

Referring to FIG. 16, a UE transmits a PUSCH signal to a BS (S902). Here, the PUSCH signal is used to transmit one or more (e.g., 2) TBs according to a transmission mode. As a response to PUSCH transmission, the BS may transmit an ACK/NACK to the UE on a PHICH after k subframes through a procedure for ACK/NACK transmission (e.g., ACK/NACK generation, ACK/NACK resource allocation, etc.) (S904). The ACK/NACK includes acknowledgement information on the PUSCH signal of step S902. If the response to PUSCH transmission is a NACK, the BS may transmit a UL grant PDCCH for retransmitting the PUSCH, to the UE after k subframes (S904). This example assumes a normal HARQ operation in which a PUSCH is transmitted once. In this case, a UL grant/PHICH corresponding to PUSCH transmission may be transmitted in the same subframe. However, in subframe bundling, a UL grant/PHICH corresponding to PUSCH transmission may be transmitted in different subframes.

Table 5 shows PHICH timing defined for TDD. For PUSCH transmission of subframe #n, a UE determines corresponding PHICH resources in subframe #(n+$k_{PHICH}$). In FDD, $k_{PHICH}$=4.

TABLE 5

| TDD UL-DL | UL subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 17 illustrates UL grant/PHICH transmission timing when UL-DL Cfg #1 is set. SF#0 to SF#9, and SF#10 to SF#19 correspond to radio frames. The numeral in a box denotes a DL subframe associated with a UL subframe. For example, a PHICH/UL grant corresponding to a PUSCH of SF#2 is transmitted in SF#2+4 (=SF#6), and a UL grant/ PHICH corresponding to a PUSCH of SF#8 is transmitted in SF#8+6 (=SF#14).

In a TDD CC (or cell), when a UE transmits an ACK/ NACK signal to a BS, if the UE has missed a part of PDCCH(s) transmitted from the BS in a period of a plurality of subframes, the UE does not even know that a PDSCH corresponding to the missed PDCCH was transmitted to the UE and thus an error may occur in generating ACK/NACK.

To solve this problem, a DL grant PDCCH/SPS release PDCCH for a TDD CC includes a DAI field (i.e., DL DAI field). The value of DL DAI field designates an cumulative value (i.e., count) of PDCCH(s) corresponding to PDSCH(s) and PDCCH(s) indicating downlink SPS release to a current subframe within DL subframe(s) n–k (k∈K). For example, if 3 DL subframes correspond to one UL subframe, PDSCHs transmitted in a period of 3 DL subframes are sequentially indexed (i.e., sequentially counted) and the index (or count) is delivered on a PDCCH for scheduling the PDSCHs. The UE may determine whether a previous PDCCH is appropriately received, by checking DAI information of the PDCCH.

Figure 18:
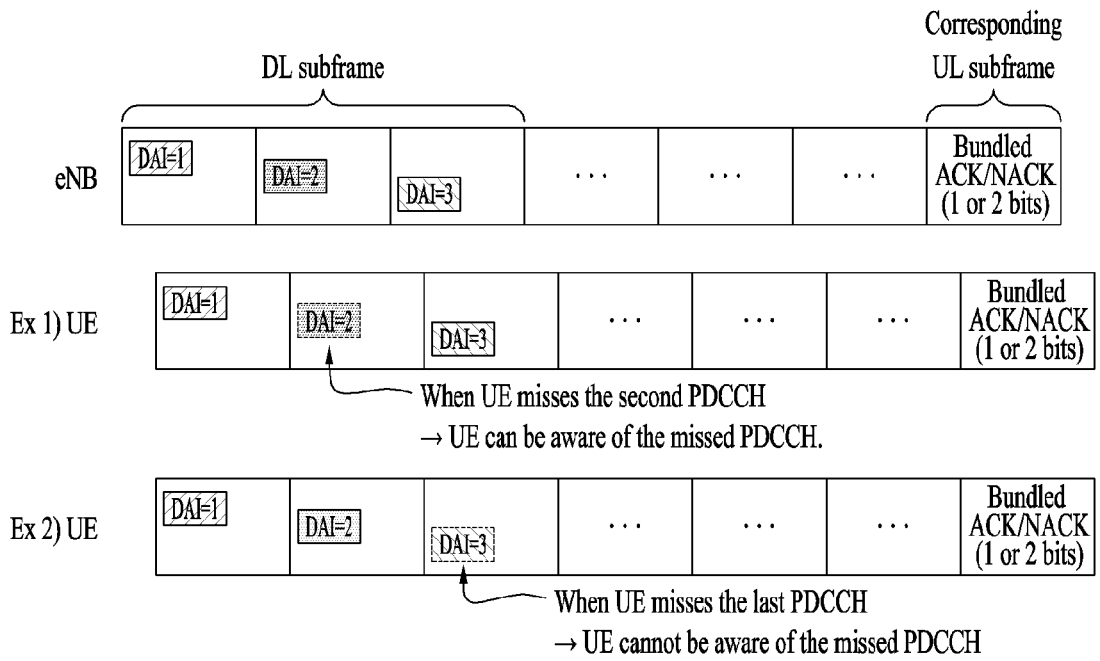
FIG. 18 illustrates an ACK/NACK transmission procedure using a downlink assignment index (DAI).

FIG. 18 illustrates an ACK/NACK transmission procedure using a DL DAI. This example assumes a TDD system configured by 3 DL subframes:1 UL subframe. It is assumed for convenience that a UE transmits ACK/NACK using PUSCH resources. In LTE, when ACK/NACK is transmitted on a PUSCH, 1-bit or 2-bit bundled ACK/NACK is transmitted.

Referring to FIG. 18, if the second PDCCH is missed as shown in Example 1, since a DL DAI value of the third PDCCH is different from a currently detected number of PDCCHs, the UE may know that the second PDCCH is missed. In this case, the UE may process an ACK/NACK response to the second PDCCH as a NACK (or NACK/ DTX). On the other hand, if the last PDCCH is missed as shown in Example 2, since the last detected DAI value of a PDCCH is equal to a currently detected number of PDCCHs, the UE may not recognize that the last PDCCH is missed (i.e., DTX). Accordingly, the UE recognizes that only two PDCCHs are scheduled for a DL subframe period. In this case, the UE bundles ACK/NACK corresponding to first two PDCCHs and thus an error occurs in an ACK/NACK feedback procedure. To solve this problem, a UL grant PDCCH also includes a DAI field (i.e., UL DAI field). The UL DAI field is a 2-bit field and includes information about the number of scheduled PDCCHs.

Table 6 shows values ($V^{DL}_{DAI}$, $V^{UL}_{DAI}$) indicated by a DAI field in a DCI format. $V^{DL}_{DAI}$ denotes a DL DAI value, and $V^{UL}_{DAI}$ denotes a UL DAI value. $V^{DL}_{DAI}$ denotes the value of DAI field in DCI format 1/1A/1B/1D/2/2A/2B/2C/ 2D for UL-DL Cfgs #0 to #6. $V^{UL}_{DAI}$ denotes the value of DAI field in DCI format 0/4 (i) if one CC (or cell) having UL-DL Cfgs #1 to #6 is configured, or (ii) if a UE is configured not to use PUCCH format 3.

TABLE 6

| DAI MSB, LSB | $V_{DAI}{}^{UL}$ or $V_{DAI}{}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit.
LSB: Least significant bit.

Table 7 shows a value ($W^{UL}_{DAI}$) indicated by a DAI field in DCI format 0/4. $W^{UL}_{DAI}$ denotes the value of DAI field in DCI format 0/4 (i) if a plurality of CCs (or cells) having UL-DL Cfgs #1 to #6 are configured, or (ii) if one CC (or cell) having UL-DL Cfgs #1 to #6 is configured and a UE is configured to use PUCCH format 3.

TABLE 7

| DAI MSB, LSB | $W_{DAI}{}^{UL}$ |
|---|---|
| 0, 0 | 1 |
| 0, 1 | 2 |
| 1, 0 | 3 |
| 1, 1 | 4 |

MSB: Most significant bit.
LSB: Least significant bit.

For convenience, unless otherwise mentioned, DL DAI is referred to as V, and UL DAI is referred to as W.

DAI is used in various ways in an ACK/NACK transmission procedure. For example, a DAI may be used for DTX detection as illustrated in FIG. 16, or used in an ACK/NACK payload generating procedure (e.g., determination of the size of ACK/NACK payload and the location of ACK/NACK information in the ACK/NACK payload) or ACK/NACK resource allocation procedure.

Initially, a description is now given of DTX detection using a DAI. Referring back to FIG. 1, when $$V^{UL}_{DAI} \neq (U_{DAI} + N_{SPS} - 1) \bmod 4 + 1,$$

it is assumed that at least one DL assignment is missed (i.e., DTX occurs), and a UE generates a NACK of all codewords according to a bundling procedure. $U_{DAI}$ denotes a total number of DL grant PDCCHs and SPS release PDCCHs detected in subframe n–k (k∈K) (see Table 3). $N_{SPS}$ denotes the number of SPS PDSCHs and is 0 or 1.

Then, a description is now given of ACK/NACK payload generation using a DAI. It is assumed for convenience that PUCCH format 3 is configured. ACK/NACK payloads for PUCCH format 3 are configured per cell, and arranged in the order of cell indices. Specifically, HARQ-ACK feedback bits for a c-th serving cell (or DL CC) are given as $$o^{ACK}_{c,0} o^{ACK}_{c,1}, \ldots, o^{ACK}_{c,O^{ACK}_c - 1} (c \geq 0).$$

$O^{ACK}_c$ denotes the number of bits (i.e., size) of HARQ-ACK payload of the c-th serving cell. Regarding the c-th serving cell, if a transmission mode for supporting transmission of a single TB is configured or if space bundling is applied, it may be given as $O^{ACK}_c = B^{DL}_c$.

On the other hand, regarding the c-th serving cell, if a transmission mode for supporting transmission of a plurality of (e.g., 2) TBs is configured and space bundling is not applied, it may be given as $O^{ACK}_c = 2B^{DL}_c$. If the HARQ-ACK feedback bits are transmitted on a PUCCH or if the HARQ-ACK feedback bits are transmitted on a PUSCH but there is no W corresponding to the PUSCH (e.g., SPS-based PUSCH), it is given as $B^{DL}_c = M$. M denotes the number of elements in set K defined in Table 3. If the TDD UL-DL Cfg is #1, #2, #3, #4, or #6 and if the HARQ-ACK feedback bits are transmitted on a PUSCH, it is given as $B^{DL}_c = W^{UL}_{DAI}$. $W^{UL}_{DAI}$ denotes a value indicated by a UL DAI field in a UL grant PDCCH (Table 7), and is simply referred to as W. If the TDD UL-DL Cfg is #5, it is given as $$B_c^{DL} = W_{DAI}^{UL} + 4\lceil (U - W_{DAI}^{UL})/4 \rceil.$$

Here, U denotes a maximum value among Ucs, and Uc denotes a total number of PDSCH(s) received and PDCCHs indicating (downlink) SPS release in subframe n−k in the c-th serving cell. Subframe n is a subframe for transmitting the HARQ-ACK feedback bits. ⌈ ⌉ denotes a ceiling function.

Regarding the c-th serving cell, if a transmission mode for supporting transmission of a single TB is configured or if space bundling is applied, the location of each ACK/NACK in HARQ-ACK payload of the serving cell is given as $$o_{c,DAI(k)-1}^{ACK}.$$

DAI(k) denotes a DL DAI value of a PDCCH detected in DL subframe n−k. On the other hand, regarding the c-th serving cell, if a transmission mode for supporting transmission of a plurality of (e.g., 2) TBs is configured and space bundling is not applied, the location of each ACK/NACK in HARQ-ACK payload of the serving cell is given as $$o_{c,2DAI(k)-2}^{ACK}$$

and $$o_{c,2DAI(k)-1}^{ACK}.$$

$$o_{c,2DAI(k)-2}^{ACK}$$

denotes HARQ-ACK for codeword 0, and $$o_{c,2DAI(k)-1}^{ACK}$$

denotes HARQ-ACK for codeword 1. Codeword 0 and codeword 1 may respectively correspond to TB0 and TB1, or TB1 and TB0 according to swapping. If PUCCH format 3 is transmitted in a subframe configured for SR transmission, PUCCH format 3 transmits ACK/NACK bits and a 1-bit SR together.

Embodiment: UCI Transmission in Inter-Site CA

In LTE-A, assume that aggregation (that is, CA) of a plurality of cells is supported and a plurality of cells aggregated for one UE is managed by one eNB (intra-site CA) (see, FIG. 1). In intra-site CA, since all cells are managed by one eNB, signaling related to various RRC configurations/reports and MAC commands/messages may be performed via any one of all aggregated cells. For example, signaling involved in a procedure of adding or releasing a specific SCell to or from a CA cell set, a procedure of changing a transmission mode (TM) of a specific cell, a procedure of performing radio resource management (RRM) measurement reporting associated with a specific cell, etc. may be performed via any cell of the CA cell set. As another example, signaling involved in a procedure of activating/deactivating a specific SCell, a buffer status report for UL buffer management, etc. may be performed via any cell of the CA cell set. As another example, a per-cell power headroom report (PHR) for UL power control, a per-timing advanced group (TAG) timing advance command (TAC) for UL synchronization control, etc. may be signaled via any cell of the CA cell set.

Meanwhile, in a next-generation system subsequent to LTE-A, a plurality of cells (e.g., micro cells) having small coverage may be deployed in a cell (e.g., a macro cell) having large coverage, for traffic optimization. For example, a macro cell and a micro cell may be aggregated for one UE, the macro cell may be mainly used for mobility management (e.g., PCell) and the micro cell may be mainly used for throughput boosting (e.g., SCell). In this case, the cells aggregated for one UE may have different coverages and may be respectively managed by different eNBs (or nodes (e.g., relays) corresponding thereto) which are geographically separated from each other (inter-site CA).

Figure 19:
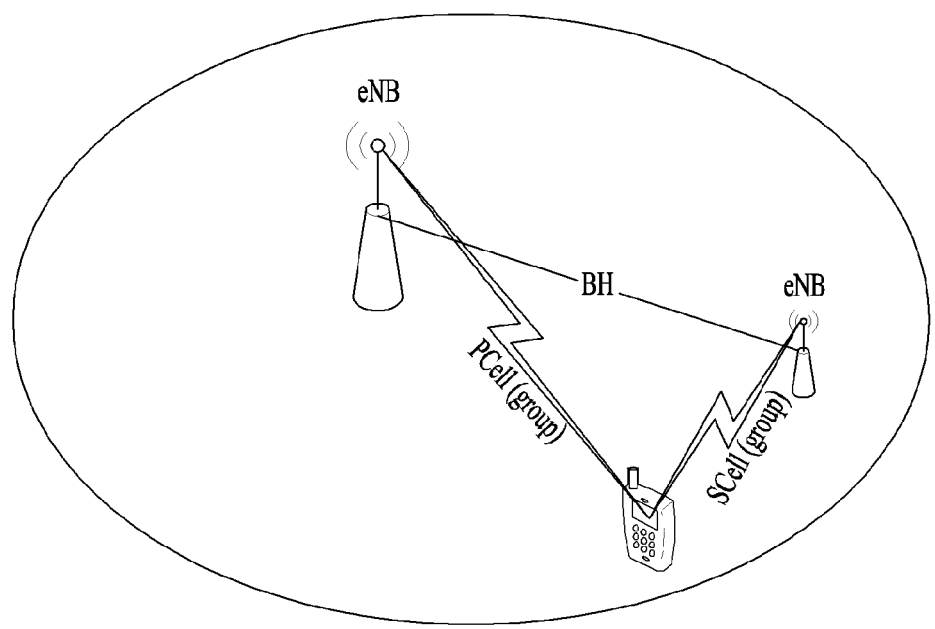
FIG. 19 is a diagram showing inter-site carrier aggregation (CA).

FIG. 19 is a diagram showing inter-site carrier aggregation (CA). Referring to FIG. 19, a method for performing radio resource control and management for a UE (e.g., all functions of RRC and some functions of MAC) at an eNB for managing a PCell (e.g., CC1) and performing data scheduling and feedback with respect to each cell (that is, CC1 or CC2) (e.g., all functions of PHY and main functions of MAC) at each eNB for managing each cell may be considered. Accordingly, in inter-site CA, information/data exchange/delivery between cells (that is, between eNBs) is required. Upon considering a conventional signaling method, in inter-site CA, information/data exchange/delivery between cells (that is, between eNBs) may be performed via a backhaul (BH) link (e.g., a wired X2 interface or a wireless backhaul link). However, when the conventional method is applied without change, cell management stability, resource control efficiency and data transmission adaptation, etc. may be considerably reduced due to latency caused in an inter-eNB signaling procedure.

For example, as shown in FIG. 19, an inter-site CA situation in which a PCell (e.g., CC1) (group) and an SCell (e.g., CC2) (group) aggregated for one UE are respectively managed by eNB-1 and eNB-2 is assumed. In addition, assume that the eNB (that is, eNB-1) for managing the PCell is responsible for managing/performing an RRC function associated with the UE corresponding thereto. At this time, if a radio resource management (RRM) measurement (e.g., reference signal received power (RSRP), reference signal received quality (RSRQ)) report associated with the SCell is not transmitted by the PCell but is transmitted via the SCell (e.g., a PUSCH), eNB-2 may deliver the RRM measurement report to eNB-1 via the BH. In addition, based on the RRM report, for example, if eNB-1 sends an RRC reconfiguration command for releasing the SCell from the CA cell set to the UE via the PCell (e.g., a PDSCH), the UE may transmit a confirmation response to the RRC reconfiguration command via the SCell (e.g., a PUSCH) instead of the PCell. In this case, eNB-2 may deliver the confirmation response to eNB-1 via the BH, etc. Accordingly, in inter-site CA, considerable latency may be caused in an inter-cell (that is, inter-eNB) signaling procedure. Thus, misalignment between the eNB and the UE for CA cell set interpretation may occur and stable/efficient cell resource management and control may not be facilitated.

As another example, in the same inter-site CA situation, per-cell PHRs of all cells may be transmitted via the PCell (e.g., the PUSCH). In this case, eNB-1 (for managing the PCell) may deliver the PHR corresponding to all PHRs or a PHR corresponding to the SCell to eNB-2 (for managing the SCell) via the BH, etc. In contrast, if per-cell PHRs of all cells are transmitted via the SCell, eNB-2 may deliver all PHRs or a PHR corresponding to the PCell to eNB-1 via the BH, etc. Even at this time, stable/efficient UL power control and adaptive UL data scheduling/transmission based thereon may not be facilitated due to latency caused by inter-eNB signaling.

Accordingly, in inter-site CA, DL/UL data scheduling and UCI (e.g., ACK/NACK, CSI and SR) transmission may be performed per cell (group) belonging to the same eNB. For example, on the assumption that a PCell and an SCell, which are aggregated for one UE, respectively belong to eNB-1 and eNB-2, a DL/UL grant, which schedules DL/UL data transmitted through the PCell, and ACK/NACK feedback for the DL/UL data can be transmitted through the PCell, and a DL/UL grant, which schedules DL/UL data transmitted through the SCell, and ACK/NACK feedback for the DL/UL data can be transmitted through the SCell. In addition, aperiodic CSI (a-CSI)/periodic CSI (p-CSI) reports and SR signaling with respect to the PCell can be transmitted through the PCell, whereas CSI report and SR signaling with respect to the SCell can be transmitted through the SCell. Accordingly, simultaneous transmission of PUCCHs in a plurality of cells needs to be performed/permitted in inter-site CA (or similar CA structure), distinguished from the conventional technology. However, permission of simultaneous PUCCH transmission in multiple cells may deteriorate single carrier property of UL signals according to state/conditions (e.g. hardware and location) of the UE, causing UL performance loss.

Therefore, the present invention provides setting of whether simultaneous transmission of multiple PUCCHs is permitted through higher layer signaling (e.g. RRC signaling). Here, simultaneous transmission of multiple PUCCHs includes simultaneous transmission of multiple PUCCHs in multiple cells (i.e. simultaneous transmission of PUCCHs for respective cells). For convenience, a parameter that indicates whether simultaneous transmission of PUCCHs is permitted is defined as "multi-PUCCH". When the multi-PUCCH is set to ON, a UE can perform simultaneous transmission of multiple PUCCHs within one UL subframe. When the multi-PUCCH is set to OFF, the UE cannot perform simultaneous transmission of multiple PUCCHs within one UL subframe. That is, when the multi-PUCCH is OFF, simultaneous transmission of multiple PUCCHs within one UL subframe is not permitted and only transmission of a single PUCCH can be permitted in one UL subframe (in a single cell).

In the meantime, it is possible to set whether to permit (i) simultaneous transmission of periodic CSI and periodic/aperiodic SRS in different cells, (ii) simultaneous transmission of periodic CSI and aperiodic CSI in different cells, (iii) simultaneous transmission of multiple aperiodic CSIs in different cells and/or (iv) simultaneous transmission of an SR and a periodic/aperiodic SRS in different cells, through higher layer signaling (e.g. RRC signaling). In addition, whether to permit simultaneous transmission of HARQ-ACK and periodic/aperiodic SRS in different cells can be set through higher layer signaling (e.g. RRC signaling).

Furthermore, whether to permit simultaneous transmission of an SRS and UCI can be independently set per cell or cell group through higher layer signaling (e.g., RRC signaling). The shortened PUCCH format can be used when simultaneous transmission of the SRS and UCI is permitted, whereas the normal PUCCH format can be used when simultaneous transmission of the SRS and UCI is not permitted.

Meanwhile, an additional UE operation/procedure may be needed in order to support setting of multi-PUCCH ON/OFF in inter-site CA (or similar CA structure). For example, PUCCH transmission per cell can be configured such that PUCCH transmissions for respective cells are performed at different timings, that is, in a TDM manner in the case of multi-PUCCH OFF. In this case, UCI transmission timing (e.g., ACK/NACK transmission timing) may need to be changed according to setting of PUCCH transmission timing per cell. The UCI transmission timing per cell may depend on a frame structure type (i.e., FDD or TDD) of a cell constituting CA, a subframe configuration form (e.g., UD-cfg) and the like. A description will be given of an ACK/NACK transmission timing setting method and an ACK/NACK feedback configuration/transmission method according to CA on the basis of ACK/NACK.

To aid in understanding of the present invention, it is assumed that two cell groups are aggregated for one UE. For example, it is assumed that cell group 1 and cell group 2 are aggregated for one UE. Here, a cell group includes one or more cells. Accordingly, a cell group can be composed of only one cell or a plurality of cells. Respective cell groups may belong to different eNBs. Specifically, a PCell group and an SCell group can be aggregated for one UE, the PCell group can belong to eNB-1 (e.g. macro eNB) and the SCell group can belong to eNB-2 (e.g. micro eNB). The PCell group refers to a cell group including a PCell. The PCell group is composed of the PCell alone or includes the PCell and one or more SCells. The SCell group refers to a cell group composed of SCells only and includes one or more SCells. However, this is exemplary and the present invention can be equally/similarly applied to a case in which three or more cell groups (e.g. one PCell group and two or more SCell groups) are aggregated for one UE.

In addition, the present invention provides methods for setting ACK/NACK transmission timing and configuring/transmitting ACK/NACK feedback when multiple cell groups are aggregated for one UE and UCI transmission is performed per cell group (i.e., when UCI with respect to/corresponding to each cell group is transmitted through a specific cell within the corresponding cell group) (or in the case of PUCCH transmission per cell). Accordingly, although the following description focuses on a case in which multiple cell groups belonging to different eNBs are aggregated for one UE, this is exemplary and the present invention can also be equally/similarly applied to a case in which multiple cell groups belonging to one eNB are aggregated for one UE. For example, when a PCell group and an SCell group are aggregated for one UE, a PUCCH may be transmitted through a PCell in the PCell group and the PUCCH may be transmitted through a specific SCell in the SCell group according to the present invention. For convenience, the SCell configured to transmit the PUCCH in the SCell group is referred to as an ACell. Here, (i) the PCell group and the SCell group may belong to different eNBs (e.g. PCell-macro eNB, SCell-micro eNB) or (ii) the PCell group and the SCell group may belong to the same eNB. The ACell can be determined as a cell having a lowest cell index (e.g., ServCell index or SCell index) from among cells configured (as scheduling cells) to transmit a PDCCH/EPDCCH (through cross-CC scheduling) in one cell group.

When A/N transmission using a PUCCH through the ACell is set, a specific PUCCH parameter and DCI signaling in association with EPDCCH-based scheduling may need to be provided to the ACell. Accordingly, the present invention proposes setting of the starting index of implicit PUCCH resources linked to an EPDCCH set (ECCE resources constituting the same) or a PUCCH index offset by which the starting index can be inferred for an EPDCCH set configured in the ACell (distinguished from a conventional scheme in which the starting index or the PUCCH index offset is set only for an EPDCCH set configured in the PCell).

Furthermore, the present invention proposes provision/activation of signaling information (e.g. TPC/ARO/ARI values), which is necessary to control/determine an A/N transmission PUCCH resource through a specific field (e.g. TPC/ARO) within a DL grant EPDCCH, even for a DL grant EPDCCH corresponding/transmitted to/in the ACell. Specifically, information signaled through the TPC/ARO field within the DL grant EPDCCH can be configured per cell according to frame structure type (FDD or TDD) and A/N feedback transmission method (PF3 or CHsel). Here, an SCell can refer to a normal SCell other than the PCell and the ACell.

1) FDD with PF3
  A. TPC field
    i. DL grant that schedules the PCell or ACell: TPC value
    ii. DL grant that schedules the SCell: ARI value
  B. ARO field
    i. DL grant that schedules the PCell or ACell: ARO value
    ii. DL grant that schedules the SCell: fixed value
2) FDD with CHsel
  A. TPC field
    i. DL grant that schedules the PCell or ACell: TPC value
    ii. DL grant that schedules the SCell: ARI value
  B. ARO field
    i. DL grant transmitted through the PCell or ACell: ARO value
    ii. DL grant transmitted through the SCell: fixed value
3) TDD with PF3
  A. TPC field
    i. DL grant that schedules the PCell or ACell: TPC value
    ii. DL grant that schedules the SCell: ARI value
  B. ARO field
    i. DL grant scheduling the PCell or ACell and corresponding to DAI=1: ARO value
    ii. DL grant that schedules the PCell or ACell and does not correspond to DAI=1: ARI value
    iii. DL grant that schedules the SCell: fixed value
4) TDD with CHsel
  A. TPC field
    i. DL grant that schedules the PCell or ACell: TPC value
    ii. DL grant that schedules the SCell: ARI value
  B. ARO field
    i. DL grant transmitted through the PCell or ACell: ARO value
    ii. DL grant transmitted through the SCell: fixed value When A/N feedback for an arbitrary cell group is configured to be transmitted through a specific ACell (here, the cell group can include the ACell), ARIs (to be applied to the same A/N transmission timing) signaled through all DL grant EPDCCHs and/or all DL grant PDCCHs (scheduling the corresponding cell group and/or transmitted through the corresponding cell group) for the corresponding cell group may have the same value. That is, a UE can operate on the assumption that ARIs in all DL grant PDCCHs have the same value. Here, an ARI can have an independent value per cell group. For example, an ARI with respect to a cell group to which a PCell belongs and an ARI with respect to a cell group to which an ACell belongs can have the same value or different values (for the same A/N transmission timing). When ACK/NACK feedback transmission using PUCCH format 3 is set for a cell group including an ACell, an A/N payload in PUCCH format 3 can be configured in such a manner that an A/N bit corresponding to the ACell is placed at the side of the MSB.

In the following description, an ACK/NACK feedback transmission scheme using "PUCCH format 3" is referred to as "PF3" and an ACK/NACK feedback transmission scheme according to "PUCCH format 1b with channel selection" is referred to as "CHsel". In addition, an ACK/NACK feedback transmission scheme using "PUCCH format 1a/1b" is referred to as "PF1". The PDCCH includes both the L-PDCCH and the EPDCCH. A/N timing refers to the relationship between DL data (that is, a PDSCH or an SPS release PDCCH) timing and HARQ-ACK timing corresponding thereto (refer to FIGS. 12 and 13). Since a special SF can be regarded to be the same as a DL SF from the viewpoint of A/N, and thus the DL SF includes both the DL SF and the special SF with respect to A/N.

A description will be given of methods for setting ACK/NACK transmission timing and configuring/transmitting ACK/NACK feedback on the basis of combination/configuration of UCI transmission cells (i.e., a PCell and an ACell) when multiple cell groups are aggregated. In the following description, a cell can be extended to a cell group.

<FDD+FDD>

An A/N transmission method based on TDM of cells in CA of FDD cells is considered as follows. When it is assumed that cell 1 and cell 2 are present, A/N corresponding to cell 1 may be transmitted through cell 1 in N UL SFs (e.g., SF #k to SF #(k+N−1)) (referred to as First part_ul, hereinafter) and A/N corresponding to cell 2 may be transmitted through cell 2 in the next M UL SFs [e.g., SF #(k+N) to SF #(k+N+M−1)] (referred to as Second part_ul, hereinafter) (N≥1, M≥1). N and M may be set to values equal to or smaller than $d_F$ (e.g., 4) in order to appropriately limit a maximum A/N payload size and/or to minimize the number of SFs that are not used for A/N feedback transmission, and preferably set to the same value (e.g., N=M≤$d_F$) equal to or less than $d_F$.

Here, only transmission of A/N corresponding to cell 1 through cell 1 is permitted in SF #k to SF #(k+N−1) (i.e., First part_ul), and thus DL data scheduling in DL SFs (i.e., SF #(k−$d_F$) to SF #(k+N−1−$d_F$)) (referred to as First part_dl, hereinafter) corresponding to First part_ul and processing of A/N corresponding to the DL data scheduling are needed in cell 2. Similarly, DL data scheduling in DL SFs (i.e., SF #(k+N−$d_F$) to SF #(k+N+M−1−$d_F$)) (referred to as Second part_dl, hereinafter) corresponding to Second part_ul and processing of A/N corresponding to the DL data scheduling are needed in cell 1. Here, $d_F$ refers to FDD A/N timing (e.g. $d_F$=4).

The following three methods can be considered. It is assumed that First part_ul and Second part_ul are configured as above. In addition, the first DL SF (i.e., SF #(k+N−$d_F$)) of Second part_dl is defined as "last SF", and First part_dl+Last SF (i.e., SF #(k−$d_F$) to SF #(k+N−$d_F$)) is defined as "entire duration". While a case in which First part_ul and Second part_ul are configured as a plurality of consecutive SFs is exemplified, First part_ul and Second part_ul may be configured as a plurality of non-consecutive SFs.

A. Sol 1: No DL Data Scheduling

A UE may operate on the assumption that DL data scheduling/transmission with respect to cell 2 is not permitted or present in First part_dl (i.e., DL SF #($k-d_F$) to DL SF #($k+N-1-d_F$)). For example, in DL SF #($k-d_F$) to DL SF #($k+N-1-d_F$), the UE may not perform monitoring (e.g. blind decoding) for a PDCCH carrying a DL DCI format, which schedules DL data of cell 2, or may ignore the PDCCH carrying the DL DCI format (may not perform PDSCH decoding) when the PDCCH is detected. The UE can perform normal operation (e.g., PDCCH monitoring and PUSCH transmission) for a UL DCI format. Accordingly, A/N feedback and timing corresponding to First part_dl may not be defined/set in cell 2. Therefore, only A/N corresponding to DL data, received in Second part_dl (i.e., DL SF #($k+N-d_F$) to DL SF #($k+N+M-1-d_F$)) through cell 2, can be transmitted in Second part_ul (i.e., UL SF #($k+N$) to UL SF #($k+N+M-1$)) through cell 2 on the basis of A/N timing.

B. Sol 2: SF-Based PF3/CHsel

The UE may apply PF3 or CHsel based on multiple SFs to A/N corresponding to DL data received in First part_dl+ Last SF (i.e., SF #($k-d_F$) to SF #($k+N-1-d_F$)+SF #($k+N-d_F$)) through cell 2. Here, PF3 or CHsel based on multiple SFs refer to a method of transmitting multiple A/N information on DL data received in multiple SFs through PF3 or using CHsel. Finally, multiple A/N information corresponding to First part_dl+Last SF can be transmitted in the first UL SF (i.e., UL SF #($k+N$)) of Second part_ul through cell 2 on the basis of PF3/CHsel.

In the case of application of PF3, when DL data is received through the last SF only, only A/N corresponding to the DL data can be transmitted using an implicit PF1 resource linked to a DL grant PDCCH that has scheduled the DL data (i.e., single A/N fallback). When DL data is received through First part_dl, A/N feedback corresponding to the entire duration can be transmitted using a PF3 resource indicated by a DL grant PDCCH that has scheduled the DL data. In this case, a TPC command for PUCCH power control may be signaled on a DL grant PDCCH that schedules the last SF and an ARI value indicating the PF3 resource may be signaled on a DL grant PDCCH that schedules First part_dl. When a plurality of DL grant PDCCHs schedules First part_dl, ARI values can be set to the same value. A/N bits are arranged in PF3 in SF order (e.g., A/N bit(s) corresponding to a preceding or lagging SF(s) is placed at the side of the MSB). If cell 2 is a specific cell (e.g., a PCell or ACell) in a cell group composed of a plurality of cells, when one DL data is detected only in the last SF of cell 2 in the interval of First part_dl+Last SF, only A/N corresponding to the DL data can be transmitted using an implicit PF1 resource linked to a DL grant PDCCH that has scheduled the DL data. In other cases, A/N can be transmitted using PF3 as described above. Accordingly, in the case of other cells belonging to the cell group including cell 2 (e.g., PCell or ACell), ARI values indicating PF3 resources can be signaled on all DL grant PDCCHs that schedule First part_dl and the last SF.

When CHsel is applied, as a PUCCH resource corresponding to the last SF, an implicit PF1 resource linked to a DL grant PDCCH that schedules the corresponding SF can be allocated. An explicit PF1 resource reserved through RRC signaling can be allocated as a PUCCH resource corresponding to First part_dl. In this case, a TPC command for PUCCH power control can be signaled on the DL grant PDCCH that schedules the last SF, and an ARI value indicating the explicit PF1 resource can be signaled in a DL grant PDCCH that schedules First part_dl. A/N may be arranged in A/N state in SF order (e.g., A/N corresponding to a preceding or lagging SF is placed at the side of the MSB).

C. Sol 3: SF and/or CW Bundling

SF bundling and/or CW bundling can be applied to A/N corresponding to DL data received in the entire duration (i.e., SF #($k-d_F$) to SF #($k+N-d_F$)) through cell 2. Here, SF bundling refers to application of A/N bundling to all or some DL subframes in each DL CC. CW bundling refers to application of A/N bundling per DL CC in each DL SF. A/N bundling refers to a logic-AND operation of A/N results. Finally, bundling based A/N feedback can be transmitted in UL SF #($k+N$) through cell 2. Bundled A/N feedback can be transmitted using an implicit PF1 resource linked to a DL grant PDCCH that schedules DL data lastly received in the entire duration or an explicit PF1 resource reserved through RRC signaling. To this end, a DAI indicating a time sequence (or accumulation value) of scheduled DL data (or DL grants) and/or an ARI value indicating the explicit PF1 resource can be signaled on a DL grant PDCCH that schedules the entire duration.

Figure 20:
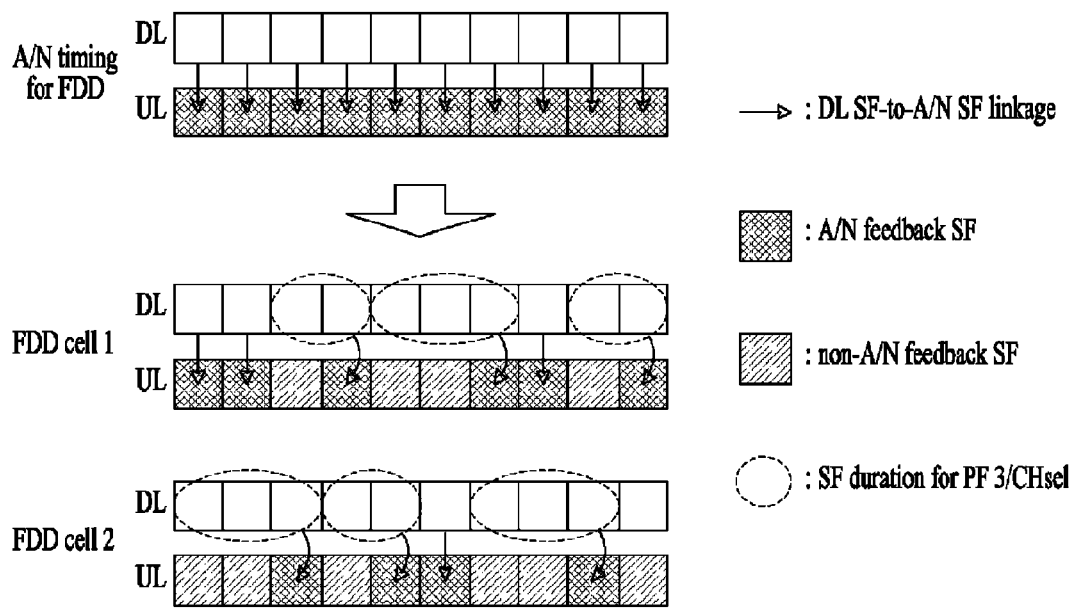

FIG. 20 illustrates an A/N transmission method according to Sol 2 and Sol 3. It is assumed that $d_F=0$ to aid in understanding of the present invention. If SF indices are provided as SF #0 to SF #9, First part_dl=[SF #0, SF #1, SF #3, SF #6, SF #7, SF #9] and Second part_dl=[SF #2, SF #4, SF #5, SF #8]. Last SF=[SF #3, SF #6, SF #9] in the case of cell 1 and Last SF=[SF #2, SF #4, SF #8] in the case of cell 2. Accordingly, Entire duration=[{SF #2, SF #3}, {SF #4, SF #5, SF #6} and {SF #8, SF #9}] in the case of cell 1 and Entire duration=[{SF #0, SF #1, SF #2}, {SF #3, SF #4} and {SF #6, SF #7, SF #8}] in the case of cell 2 (dotted-line circles). In this case, A/N corresponding to the entire duration can be transmitted in a UL SF (i.e., Last SF+$d_F$) corresponding to the last SF through PF3, CHsel, bundling and the like in each cell.

Meanwhile, different timing advance (TA) values (i.e., UL transmission timing of a UL radio frame with respect to DL radio frame) applied to UL transmission in multiple cells, which are aggregated for one UE, may be set for the cells. In this case, A/N transmission signals (e.g., PUCCHs) of different cells, which are set in neighboring UL SFs, may collide at the same timing due to a TA difference between cells. In addition, considering a UE (i.e., a UL non-CA UE) for which CA capability/operation for UL is not supported/permitted, a UL operation frequency needs to be dynamically switched between neighboring UL SFs in order to apply the TDM-based A/N (PUCCH) transmission method between cells. In this case, A/N transmission signals (e.g., PUCCHs) of different cells, which are set in neighboring UL SFs, may collide at the same timing due to UL switching time. Accordingly, the present invention proposes provision of an SF gap between contiguously configured A/N transmission timings of different cells in order to maintain single carrier property of UL signals. Here, the SF gap refers to an SF in which UL transmission is limited. For example, transmission of at least one of UCI (e.g., A/N), a PUCCH, a PUSCH, an SRS and a PRACH may not be performed/defined in the SF gap. For example, the SF gap can be designated/set as an SF in which transmission of UCI (e.g. A/N) and/or a PUCCH is not performed/defined, or as an SF in which UL data and/or PUSCH scheduling/transmission are not performed/defined (in the case of a UL non-CA UE).

For example, when cell 1 and cell 2 are assumed, A/N feedback corresponding to cell 1 can be transmitted in N UL SFs (e.g., SF #k to SF #(k+N−1)) (First part_ul) through cell 1, the following UL SF (e.g., SF #(k+N)) can be set as an SF gap, A/N feedback corresponding to cell 2 can be transmitted in the following M UL SFs (e.g., SF #(k+N+1) to SF #(k+N+M)) (Second part_ul) through cell 2, and the next UL SF (e.g., SF #(k+N+M+1)) can be set as an SF gap. Accordingly, with respect to A/N timing, the aforementioned proposed method (Sol 1 to 3) can be applied in a state that a DL SF corresponding to an SF gap has been added as the last SF that constitutes First part_dl or Second part_dl. In the above example, DL SF #(k+N−$d_F$) can be added to First part-dl and DL SF #(k+N+M+1−$d_F$) can be added to Second part-dl.

The aforementioned SF gap based method can be equally/similarly applied to an FDD cell when the FDD cell and a TDD cell are aggregated.

<FDD+TDD>

The following two methods are proposed for A/N transmission based on TDM of cells when an FDD cell and a TDD cell are aggregated.

A. Alt 1-1: Keeping Original Timing for TDD Cell

Figure 21:
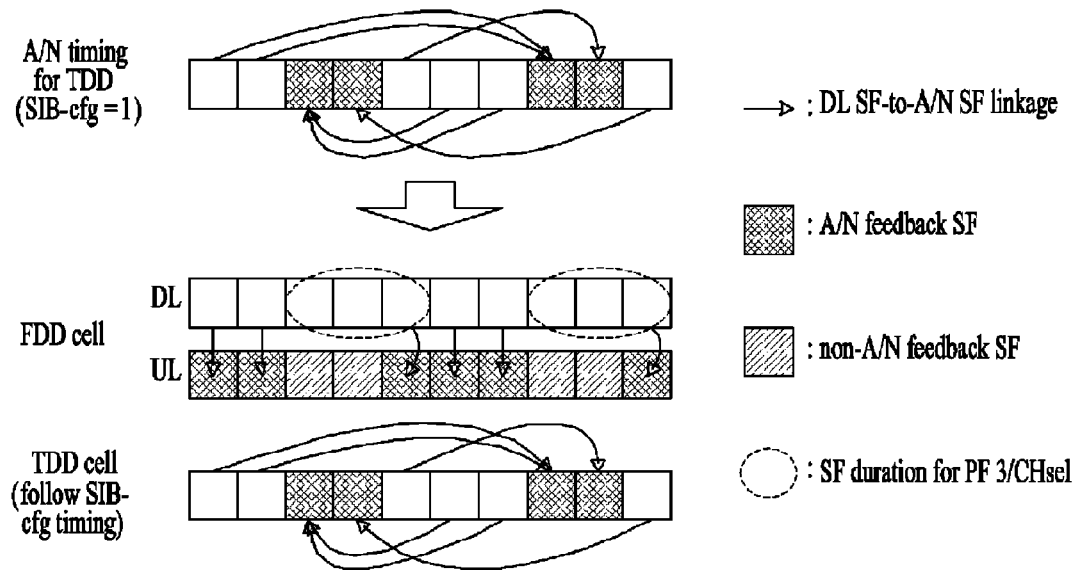

In the case of the TDD cell, A/N feedback configuration/transmission can be performed using A/N timing defined in UD-cfg of the TDD cell. In the case of the FDD cell, an SF interval, which is set to A/N transmission SFs in the TDD cell, can be regarded as an SF interval that is not set to A/N transmission SFs, that is, First part_ul in the FDD cell and Sol 1 to 3 can be applied. In this example, it is possible to prevent an A/N feedback delay/size increase for the TDD cell by keeping the original A/N timing of the TDD cell. FIG. 21 illustrates an A/N transmission method according to this method. Referring to FIG. 21, A/N timing according to SIB-cfg is applied to the TDD cell, and Sol 2 is applied to the FDD cell in a state that a UL SF interval of the TDD cell is regarded as First part_ul.

Considering a conventional CA situation (e.g., a case in which cells aggregated for one UE belong to the same eNB), in the case of a TDD cell, A/N timing defined in UD-cfg of the TDD cell can be applied. In the case of an FDD cell, the original A/N timing based on FDD A/N delay $d_F$ can be applied. In this case, it is possible to consider a method of transmitting A/N for all cells (FDD cell and/or TDD cell) through the TDD cell in an SF designated as A/N transmission timing of the TDD cell and through the FDD cell in the remaining SFs (i.e., SFs that do not correspond to A/N transmission timing of the TDD cell). For example, if one TDD cell and one FDD cell are carrier-aggregated, A/N for both the FDD cell and the TDD cell can be transmitted in an SF designated as A/N transmission timing of the TDD cell through the TDD cell, and only A/N for the FDD cell can be transmitted in the remaining SFs (i.e., SFs which do not correspond to A/N transmission timing of the TDD cell) through the FDD cell.

B. Alt 1-2: Applying DL Superset-Cfg for TDD Cell

This method reduces an A/N feedback delay/size for the FDD cell by decreasing the size/frequency of First part_ul occurred in the FDD cell in Alt 1-1. According to this method, A/N feedback configuration/transmission can be performed using A/N timing defined in DL superset-cfg in the case of the TDD cell. Here, DL superset-cfg refers to UD-cfg (i.e., UD-cfg in which a larger number of DL SFs, which includes DL SFs of SIB-cfg, than those of SIB-cfg are configured) in which DL SFs are configured for a superset of DL SFs that constitute SIB-cfg (refer to Table 1). DL superset-cfg is equivalent to UL subset-cfg. UL subset-cfg refers to UD-cfg (i.e. UD-cfg in which a smaller number of UL SFs, which are included in UL SFs of SIB-cfg, than those of SIB-cfg are configured) in which UL SFs are configured for a superset of UL SFs that constitute SIB-cfg. In the case of FDD cell, an SF interval, which is set to an A/N transmission SF in DL superset-cfg, is regarded as First part_ul and Sol 1 to 3 can be applied.

FIG. 22 illustrates an A/N transmission according to this method. Referring to FIG. 22, A/N timing according to DL superset-cfg is applied to the TDD cell, and Sol 2 is applied to the FDD cell in a state that a UL SF interval according to DL superset-cfg is regarded as First part_ul. Specifically, considering a case in which SIB-cfg of the TDD cell is UD-cfg #1, A/N feedback configuration/transmission can be performed using A/N timing defined in one of UD-cfg #2, #4 and #5 which are DL superset-cfg of UD-cfg #1 in the case of the TDD cell. If DL superset-cfg is set to UD-cfg #2, Sol 1 to 3 can be applied to the FDD cell by regarding SF #2 and SF #7 configured as A/N transmission SFs in UD-cfg #2 as First part_ul. When A/N timing is applied to the TDD cell based on Alt 1-2, application of A/N timing of DL superset-cfg (and execution of DL data detection/reception operation) and corresponding A/N signal/bit configuration can be set/defined only for DL SFs (i.e., DL SFs (and S SF) in SIB-cfg) of the TDD cell. In other words, A/N timing of DL superset-cfg (and DL data detection/reception operation) and corresponding A/N signal/bit configuration may not be set/applied for UL SFs (i.e., UL SFs in SIB-cfg) of the TDD cell. For example, when DL data is detected in subframe #n−k, A/N can be transmitted in subframe #n (k ⊂ Kc) in the case of the TDD cell. Here, Kc includes values of $k_{sp} \subset K_{sp}$ and specifically includes only a $k_{sp}$ value that allows subframe #n−$k_{sp}$ to actually correspond to a DL SF or an S SF in the TDD cell. $K_{sp}$ indicates a DASI value of DL superset-cfg (refer to Table 3).

In the meantime, A/N timing defined in DL superset-cfg may differ from A/N timing defined in SIB-cfg of the TDD cell. Accordingly, implicit PF1 linkage based on A/N timing of SIB-cfg (i.e., implicit PF1 resource indices linked to DL SFs) may not be applied. To solve this problem, only explicit PF1 resources reserved through RRC signaling may be used for CHsel. Furthermore, when PF3 is set for A/N transmission, if only DL data corresponding to single A/N fallback (i.e., data corresponding to a PDCCH having a DAI initial value (e.g., 1) or an SPS release PDCCH having the DAI initial value (e.g., 1)) is received, explicit PF1 resources reserved through RRC signaling can be used for A/N transmission. In addition, when CHsel is set for A/N transmission, ARIs indicating explicit PF1 resources can be signaled through all DL grant PDCCHs. Further, when PF3 is set for A/N transmission, an ARI indicating an explicit PF1 resource can be signaled through a DL grant PDCCH having a DAI initial value (e.g., 1).

<Same TDD UD-cfg>

The following method is proposed for TDM-based A/N transmission between cells when TDD cells having the same UD-cfg are aggregated. When cell 1 and cell 2 are assumed, in the case of cell 1, A/N feedback configuration/transmission can be performed using A/N timing defined in DL superset-cfg 1 with respect to SIB-cfg of cell 1 on the basis of Alt 1-2. In the case of cell 2, A/N feedback configuration/transmission can be performed on the basis of A/N timing defined in DL superset-cfg 2 with respect to SIB-cfg of cell 2. UL SF timing of DL superset-cfg 2 can be (cyclically) SF-shifted such that A/N transmission timing of cell 1 differs from A/N transmission timing of cell 2. For convenience, DL superset-cfg whose UL SF timing has been SF-shifted is referred to as SF-shifted DL superset-cfg.

Here, DL superset-cfg 1 and DL superset-cfg 2 may be identical to or different from each other. Preferably, DL superset-cfg per cell may be set such that UL SF timing (i.e., A/N transmission timing) determined on the basis of DL superset-cfg 1 differs from that determined on the basis of SF-shifted DL superset-cfg 2. For example, when SIB-cfg is UD-cfg #1, DL superset-cfg is UD-cfg #2, #4, #5. In this case, the following combinations are possible.

[DL superset-cfg 1=UD-cfg #2, DL superset-cfg 2=#2 or #5],
[DL superset-cfg 1=UD-cfg #4, DL superset-cfg 2=#4 or #5],
[DL superset-cfg 1=UD-cfg #5, DL superset-cfg 2=#2, #4 or #5].

When SIB-cfg is UD-cfg #3, DL superset-cfg is UD-cfg #4, #5. In this case, the following combinations are possible.

[DL superset-cfg 1=UD-cfg #4, DL superset-cfg 2=#5],
[DL superset-cfg 1=UD-cfg #5, DL superset-cfg 2=#4 or #5].

The method of applying SF-shifted DL superset-cfg will now be described in more detail. It is assumed that both SIB-cfgs of two cells are UD-cfg #1. In this case, A/N feedback configuration/transmission can be performed using A/N timing defined in UD-cfg #2 corresponding to DL superset-cfg for UD-cfg #1 in the case of cell 1 (that is, SF #2 and SF #7 are configured as A/N transmission SFs in cell 1). In the case of cell 2, A/N feedback configuration/transmission can be performed by applying A/N timing on the basis of UL SF timing which has been shifted by 1 SF to the right in UD-cfg #2 corresponding to DL superset-cfg 2. In this case, SFs (i.e., SF #3 and SF #8) other than SF #2 and SF #7 can be configured as A/N transmission SFs in cell 2.

When SF-shifted DL superset-cfg is applied, DASI that determines A/N timing can be determined through the following two methods.

A. Opt 1: Keeping Original DASI

The original DASI (based on Table 3) before SF-shift is applied to an SF-shifted UL SF. For example, DASI corresponding to UL SF #n before application of SF-shift (by k SFs) can be applied to SF-shifted UL SF #(n+k). In this example, a DASI value defined in SF #2 of UD-cfg #2 can be applied to SF #2 in the case of cell 1, and a DASI value defined in SF #2 of UD-cfg #2 can be applied to SF #3 in the case of cell 2. FIG. 23 illustrates an A/N transmission method according to this method.

B. Opt 2: Applying SF-Shifted DASI

This method applies a value, which is obtained by adding the number of shifted SFs (k (SFs)) to the original DASI (based on Table 3), to a shifted UL SF. For example, a value, which is obtained by adding k to DASI corresponding to UL SF #n before application of SF-shift, can be applied to SF-shifted UL SF #(n+k). In this example, a DASI value defined in SF #2 of UD-cfg #2 can be applied to SF #2 in the case of cell 1. In the case of cell 2, a value (i.e. DASI+1) obtained by adding an SF offset corresponding to 1 SF shift to the right (i.e. +1) to a DASI value defined in SF #2 of UD-cfg #2 can be applied to SF #3. If (DASI+SF offset) is equal to or greater than $(10+d_F)$, (DASI+SF offset–10) can be applied (e.g., $d_F$=4).

Meanwhile, when A/N timing is applied to the TDD cell on the basis of SF-shifted DL superset-cfg (e.g., Opt 1 or Opt 2), application of A/N timing of SF-shifted DL superset-cfg (and execution of DL data detection/reception operation) and corresponding A/N signal/bit configuration can be defined/set only for DL SFs (i.e., DL SFs in SIB-cfg) of the TDD cell. That is, A/N timing of SF-shifted DL superset-cfg (and DL data detection/reception operation) and corresponding A/N signal/bit configuration may not be set/applied to UL SFs (i.e., UL SFs in SIB-cfg) of the TDD cell. For example, when DL data is detected in subframe #n−k, A/N can be transmitted in subframe #n (k⊂Kc). Here, Kc includes values of $k_{sp} \subset K_{sp}$ and includes only $k_{sp}$ value that allows subframe #n−$k_{sp}$ to actually correspond to a DL SF or an S SF in the TDD cell. $K_{sp}$ indicates a DASI value of DL superset-cfg (refer to Table 3).

In the meantime, A/N timing defined in SF-shifted DL superset-cfg may differ from A/N timing defined in SIB-cfg of the TDD cell. Accordingly, implicit PF1 linkage based on A/N timing of SIB-cfg (i.e., implicit PF1 resource indices linked to DL SFs) may not be applied. To solve this problem, only explicit PF1 resources reserved through RRC signaling may be used for CHsel. Furthermore, when PF3 is set for A/N transmission, if only DL data corresponding to single A/N fallback (i.e., data corresponding to a PDCCH having a DAI initial value (e.g., 1) or an SPS release PDCCH having the DAI initial value (e.g., 1)) is received, explicit PF1 resources reserved through RRC signaling can be used for A/N transmission. In addition, when CHsel is set for A/N transmission, ARIs indicating explicit PF1 resources can be signaled through all DL grant PDCCHs. Further, when PF3 is set for A/N transmission, an ARI indicating an explicit PF1 resource can be signaled through a DL grant PDCCH having a DAI initial value (e.g., 1).

Meanwhile, different TA values applied to UL transmissions in multiple cells, which are aggregated for one UE, may be set for the cells. In this case, A/N transmission signals (e.g., PUCCHs) of different cells, which are set in neighboring UL SFs, may collide at the same timing due to a TA difference between cells. In addition, considering a UL non-CA UE, a UL operation frequency needs to be dynamically switched between neighboring UL SFs in order to apply the TDM-based A/N (PUCCH) transmission method between cells. In this case, A/N transmission signals (e.g., PUCCHs) of different cells, which are set in neighboring UL SFs, may collide at the same timing due to UL switching time.

Accordingly, to maintain single carrier property of UL signals, DL superset-cfg and/or SF-shifted DL superset-cfg are selected/applied such that A/N transmission SF timings of different cells are separately set in a front part (e.g., SF #0 to SF #4) and a rear part (e.g., SF #5 to SF #9) of a radio frame. For example, when SIB-cfgs of cell 1 and cell 2 are both set to UD-cfg #1, A/N feedback configuration/transmission can be performed using A/N timing defined in DL superset-cfg 1=UD-cfg #4 in the case of cell 1, whereas A/N feedback configuration/transmission can be performed using A/N timing based on UL SF timing shifted by 5 SFs to the right in DL superset-cfg 2=UD-cfg #4 or #5 in the case of cell 2. According to this example, SF #2 and SF #3 corresponding to the front part of the radio frame are configured as A/N transmission SFs of cell 1 and SF #7 and SF #8 corresponding to the rear part of the radio frame are configured as A/N transmission SFs of cell 2.

When all aggregated cells have SIB-cfgs including UL SFs corresponding to a front part of a radio frame, DL superset-cfg and/or SF-shifted DL superset-cfg suitable to allow a UL SF gap (e.g., an SF in which A/N feedback (and/or UCI/PUCCH and/or UL data/PUSCH) transmission is not performed/defined) to be provided between A/N transmission SF timings of different cells can be selected/applied.

The aforementioned methods (e.g., the SF gap based method and the method of separating the front and rear parts of a radio frame) can be equally/similarly applied to a case in which TDD cells having different UD-cfgs are aggregated.

<Different TDD UD-cfg>

The following two methods are proposed for TDM-based A/N transmission between cells when TDD cells having different UD-cfgs are aggregated.

A. Alt 2-1: Keeping Original Timing for One Cell

Figure 24:
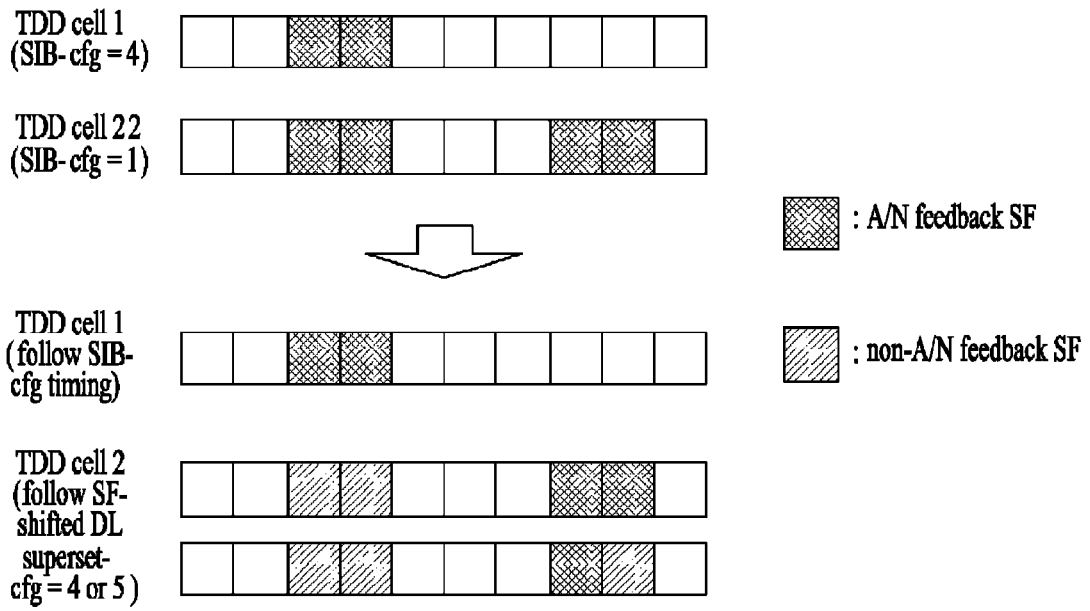

In the case of cell 1, A/N feedback configuration/transmission can be performed using A/N timing defined in SIB-cfg of cell 1. In the case of cell 2, A/N timing can be applied and A/N feedback configuration/transmission can be performed on the basis of DL superset-cfg with respect to SIB-cfg of cell 2. UL SF timing of DL superset-cfg can be (cyclically) SF-shifted such that A/N transmission timing of cell 1 differs from A/N transmission timing of cell 2. This method can prevent an A/N feedback delay/size increase with respect to a specific cell by keeping the original A/N timing of the specific cell. FIG. 24 illustrates an A/N transmission method according to this method. Referring to FIG. 24, A/N timing according to SIB-cfg is applied to TDD cell 1 and A/N timing according to SF-shifted DL superset-cfg is applied to TDD cell 2.

Here, SIB-cfg of cell 1 and DL superset-cfg of cell 2 may be identical to or different from each other. Preferably, DL superset-cfg of cell 2 may be limited such that UL SF timing (i.e., A/N transmission timing) determined on the basis of SIB-cfg of cell 1 differs from that determined on the basis of SF-shifted DL superset-cfg of cell 2. For example, when SIB-cfg of cell 1 and SIB-cfg of cell 2 are respectively UD-cfgs #4 and #1, DL superset-cfg of cell 2 can be limited to UD-cfg #4 or #5. When SIB-cfg of cell 1 and SIB-cfg of cell 2 are respectively UD-cfgs #4 and #3, DL superset-cfg of cell 2 can be limited to UD-cfg #5.

Meanwhile, considering a conventional CA situation (e.g., when cells aggregated for one UE belong to the same eNB), A/N for cells (cell 1 and/or cell 2) may be transmitted through a specific cell (e.g., cell 1) in an SF designated as A/N transmission timing of the specific cell (e.g., cell 1) and transmitted through the other cell (e.g., cell 2) in the remaining SFs (i.e., SFs other than the A/N transmission timing of the specific cell) when A/N timings defined in SIB-cfgs of cell 1 and cell 2 are applied to cell 1 and cell 2. The specific cell may be set to a PCell, an ACell or a cell having a smaller/larger number of SFs designated as A/N transmission timing. For example, when cell 1 and cell 2 are aggregated and cell 1 is a specific cell, only A/N for cell 1 or A/N for both cell 1 and cell 2 (according to SF) can be transmitted in an SF designated as A/N transmission timing of cell 1 (through cell 1). In the remaining SFs (i.e., SFs other than the A/N transmission timing of cell 1), only A/N for cell 2 can be transmitted (through cell 2).

B. Alt 2-2: Applying DL Superset-Cfg for Both Cells

Figure 25:
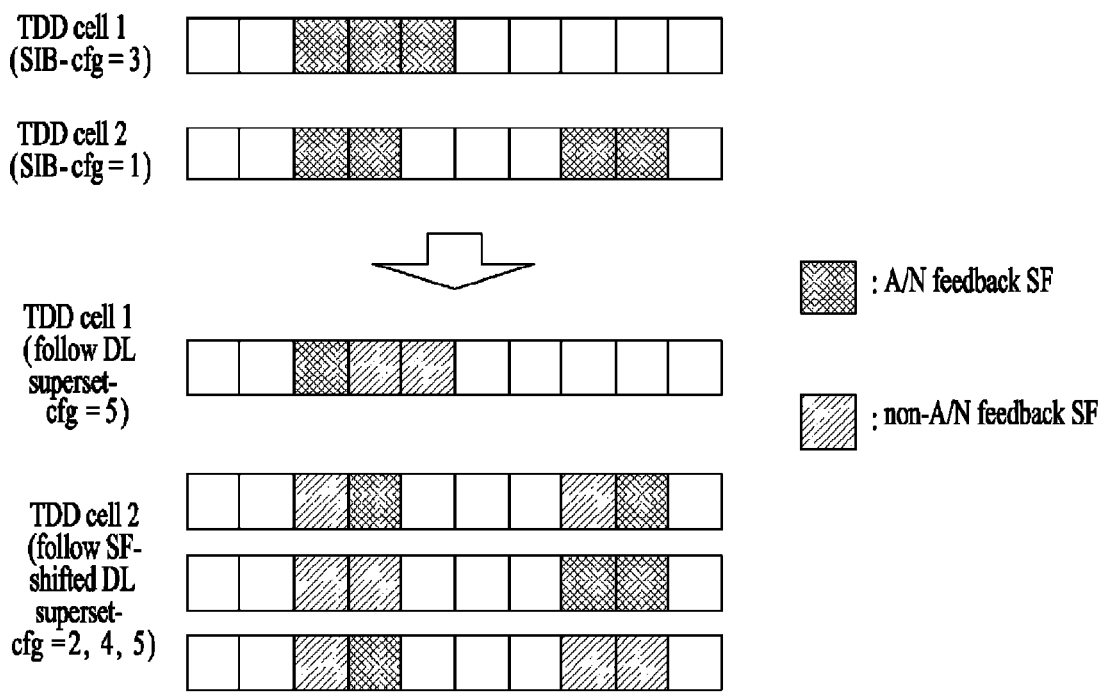

This method decreases an A/N feedback delay/size increase which occurs only in cell 2 in Alt 2-1. In the case of cell 1, A/N feedback configuration/transmission can be performed using A/N timing defined in DL superset-cfg 1 with respect to SIB-cfg of cell 1. In the case of cell 2, A/N feedback configuration/transmission can be performed on the basis of A/N timing defined in DL superset-cfg 2 with respect to SIB-cfg of cell 2. UL SF timing of DL superset-cfg 2 can be (cyclically) SF-shifted such that A/N transmission timing of cell 1 differs from that of cell 2. FIG. 25 illustrates an A/N transmission method according to this method. Referring to FIG. 25, A/N timing according to DL superset-cfg is applied to TDD cell 1 and A/N timing according to SF-shifted DL superset-cfg is applied to TDD cell 2.

DL superset-cfg 1 and DL superset-cfg 2 may be identical or different. Preferably, DL superset-cfg per cell may be limited such that UL SF timing (i.e., A/N transmission timing) determined on the basis of DL superset-cfg 1 differs from that determined on the basis of SF-shifted DL superset-cfg 2. For example, when SIB-cfg of cell 1 and SIB-cfg of cell 2 are respectively set to UD-cfgs #3 and #1, DL superset-cfg 1 can be UD-cfgs #4 and #5. In this case, the following combinations are possible.

[DL superset-cfg 1=UD-cfg #4, DL superset-cfg 2=#4 or #5],

[DL superset-cfg 1=UD-cfg #5, DL superset-cfg 2=#2, #4 or #5].

The aforementioned A/N timing setting method, PUCCH resource allocation method and DASI determination method (Opt 1 or Opt 2) for application of DL superset-cfg and SF-shifted DL superset-cfg can be equally/similarly applied to this example.

The inter-cell TDM based A/N transmission methods (SF (group) based methods) on an SF (group) basis have been described. Alternatively, an A/N transmission SF interval per cell may be set on the basis of a radio frame or a multiple of the radio frame in order to use the original A/N timing defined per cell. Here, one or more radio frames used as the unit of the A/N transmission SF interval per cell are defined as a radio frame group (RFG). In addition, (in the case of a UL non-CA UE,) the A/N transmission SF interval per cell (or an SF interval in which UCI/PUCCH and/or UL data/PUSCH transmission/scheduling is performed/defined) may be set on an RFG basis in consideration of a UL HARQ process/timeline (e.g., UL grant-to-PUSCH and PUSCH-to-PHICH) for PUSCH transmission. Here, the number of radio frames constituting an RFG can be set to 4 in the case of FDD, and 5 for UD-cfgs #1 to #5, 6 for UD-cfg #6 and 7 for UD-cfg #0 in the case of TDD. In this case, it is possible to match the number/index of the first UL SF constituting one UL HARQ process with the number/index of the last UL SF while supporting/allowing at least four PUSCH retransmissions.

Specifically, RFG based A/N transmission SF intervals can be alternately set between cells such that N RFGs are set to an A/N transmission SF interval corresponding to cell 1, the following M RFGs are set to an A/N transmission SF interval corresponding to cell 2 and the next L RFGs are set to the A/N transmission SF interval corresponding to cell 1 (N≥1, M≥1 an d L≥1). In this case, the original A/N timing defined per cell can be applied to the A/N transmission SF (RFG) interval of each cell.

Alternatively, the RFG based method and the SF (group) based method may be alternatively applied in such a manner that N RFGs are set to the A/N transmission SF interval corresponding to cell 1, the following M RFGs are set to the aforementioned SF (group) based A/N transmission SF interval per cell and the next L RFGs are set to the A/N transmission SF interval corresponding to cell 1 (or cell 2). In this case, in RFGs other than SFs (RFGs) to which the SF (group) based method is applied, the original A/N timing of a cell configured to perform A/N transmission in the corresponding RFGs can be applied.

Alternatively, a cell-dedicated A/N transmission RFG interval and a cell-common A/N transmission RFG interval may be alternately set in such a manner that N RFGs are set to the A/N transmission SF interval corresponding to cell 1, the following M RFGs are set to an A/N transmission SF interval corresponding to both cell 1 and cell 2 and the next L RFGs are set to the A/N transmission SF interval corresponding to cell 1 (or cell 2). In this case, the original A/N timing defined per cell can be applied to the A/N transmission RFG interval commonly corresponding to both the cells and collision between A/N PUCCHs of the cells, which may occur due to application of the original A/N timing, may be preferably prevented/mitigated through appropriate scheduling in eNB(s). A UE may operate on the assumption that simultaneous transmission of multiple A/N PUCCHs (corresponding to multiple cells and/or on the multiple cells) through one SF within the cell-common A/N transmission RFG interval is not required. For example, when transmission of multiple PUCCHs through one SF within the cell-common A/N transmission RFG interval is required, the UE can transmit only one PUCCH and drop transmission of the remaining PUCCH(s) according to a specific rule (e.g., UCI priority) or drop all PUCCH transmissions.

When the aforementioned methods (or other methods) are applied, A/N timing per cell may be set to be different from the original timing ($d_F$ in the case of FDD and DASI according to SIB-cfg in the case of TDD). In this case, A/N timing inconsistency between the UE and the eNB may occur in reconfiguration intervals which involve RRC signaling and the like. To overcome such problem, the original A/N timing of a cell is applied (exceptionally) to only A/N feedback corresponding to DL data scheduled through a specific SF, a specific search space (CCE resources occupied by the corresponding region), a specific PDCCH candidate and/or a specific DCI format in the cell. The specific search space may be a common search space and the specific DCI format may be DCI format 1A.

In addition, to avoid simultaneous transmission of multiple PUCCHs or simultaneous PUCCH transmissions in multiple cells, PUCCH transmission timing per cell may be set only within A/N transmission timing per cell. In other words, transmission timing of UCI, such as p-CSI and SR, per cell can be set to an A/N transmission SF (or a subset thereof) determined on the basis of the aforementioned methods. In this case, when transmission timing of periodic UCI (e.g., p-CSI and SR) does not correspond to A/N transmission timing per cell, transmission of periodic UCI can be dropped. An A/N feedback transmission method (e.g., PF3 or CHsel) may be independently set per cell (group), per SF (group), per cell (group)/SF (group) combination and/or per frame structure type (e.g., FDD or TDD).

Alternatively, when PUCCHs including UCI (such as A/N) corresponding to respective cells are transmitted using TDM through the methods proposed by the present invention (or other methods), all UCI PUCCHs corresponding to respective cells may be transmitted through only UL of a PCell as in the conventional method, distinguished from the aforementioned method in which a UCI PUCCH corresponding to a specific cell is independently transmitted through UL of the specific cell. For example, SF #N can be set to UCI PUCCH transmission timing corresponding to a PCell and SF #(N+k) can be set to a UCI PUCCH transmission timing corresponding to an SCell. In this case, a UCI PUCCH corresponding to the PCell can be transmitted in SF #N (which is defined as "PCell UCI-PUCCH SF") through UL of the PCell, and a UCI PUCCH corresponding to the SCell can be transmitted in SF #(N+k) (which is defined as "SCell UCI-PUCCH SF") through UL of the PCell. This is because an eNB that manages/controls the SCell in view of a UE may have capability of overhearing, i.e. detecting/receiving, the UCI PUCCH corresponding to the SCell through a carrier corresponding to the PCell of the UE, that is, a frequency band. To this end, (an A/N transmission PUCCH resource corresponding to the PCell can be allocated as an implicit PUCCH linked to a DL grant that schedules the PCell, whereas) an A/N transmission PUCCH resource corresponding to the SCell can use an explicit PUCCH predetermined (through RRC signaling and the like).

Considering such operation, when the UCI PUCCH corresponding to the SCell is transmitted in the SCell UCI-PUCCH SF through UL of the PCell, a TA value set to the SCell may be used or (when UL corresponding to the SCell is not present in respect to the UE) an additional TA value to be applied to only transmission of the UCI PUCCH corresponding to the SCell may be set. In addition, TPC signaled through a DL grant that schedules the PCell may be applied to only the PCell UCI-PUCCH SF and TPC signaled through a DL grant that schedules the SCell may be applied to only the SCell UCI-PUCCH SF.

When UCI is piggybacked on a PUSCH in inter-site CA, UCI corresponding to a specific cell (group) is preferably piggybacked only on a PUSCH transmitted through the specific cell (group). Accordingly, when only a PUSCH transmitted through the PCell in the SCell UCI-PUCCH SF (generalized to an SF set to a timing when the UCI PUCCH corresponding to the SCell is transmitted)/PUSCH is scheduled, the following methods can be considered.

Method 1) simultaneous transmission of the UCI PUCCH corresponding to the SCell and the PUSCH scheduled to the PCell is permitted without UCI piggybacking on the PUSCH, Method 2) transmission of the PUSCH scheduled to the PCell is skipped/omitted and only the UCI PUCCH corresponding to the SCell is transmitted, Method 3) transmission of the UCI PUCCH corresponding to the SCell is dropped/omitted and only the PUSCH scheduled to the PCell is transmitted, Method 4) scheduling of the PUSCH transmitted through the PCell is not supported/permitted in the SCell UCI-PUCCH SF (that is, the UE can operate on the assumption that the PUSCH transmitted through the PCell is not scheduled in the SCell UCI-PUCCH SF) or Method 5) the UE can operate on the assumption that transmission of the UCI PUCCH corresponding to the SCell and transmission of the PUSCH through the PCell are not scheduled/set to be simultaneously performed through one UL SF (e.g., SCell UCI-PUCCH SF).

Here, method 2) can be applied when the UCI corresponding to the SCell is A/N or an SR and method 3) can be applied when the UCI is CSI. In addition, method 3) can be exceptionally applied when the A/N corresponding to the SCell is composed of NACK or DTX only or the SR is negative, and method 2) can be exceptionally applied when the CSI corresponding to the SCell includes RI information. When a PUSCH transmitted through the SCell is scheduled in the SCell UCI-PUCCH SF, the corresponding UCI can be piggybacked on the PUSCH scheduled to the SCell. The aforementioned operations/methods may be applied when the PCell and the SCell are respectively replaced by different cells (cell groups) 1 and 2, and methods 1) to 5) may be applied depending on whether simultaneous transmission of multiple UL channels (e.g., a PUCCH and a PUSCH) is permitted.

Alternatively, subcarriers (corresponding to REs) in SC-FDMA symbols constituting a conventional PUCCH (i.e., legacy PUCCH) resource may be divided into even indices (i.e., even-comb) and odd indices (i.e., odd-comb) and PUCCHs corresponding to cells (UCI of the cells) may be transmitted using different combs. For example, a PUCCH corresponding to cell 1 (UCI of the corresponding cell) can use even-comb and a PUCCH corresponding to cell 2 (UCI of the corresponding cell) can use odd-comb in a legacy PUCCH resource region. Alternatively, SC-FDMA symbols constituting a legacy PUCCH resource may be divided into even indices (i.e., even-symbol) and odd indices (i.e., odd-symbol) and PUCCHs corresponding to cells (UCI of the cells) may be transmitted using different symbols. For example, the PUCCH corresponding to cell 1 (UCI of the corresponding cell) can use the even-symbol and the PUCCH corresponding to cell 2 (UCI of the corresponding cell) can use the odd-symbol in a legacy PUCCH resource region. Such method may be applied to only SC-FDMA symbols through which a DMRS is transmitted (i.e., the remaining SC-FDMA symbols are configured as in the legacy PUCCH) or applied to all SC-FDMA symbols irrespective of whether the DMRS is transmitted. It is possible to perform simultaneous transmission of multiple PUCCHS through one cell as in an overhearing case or to perform simultaneous transmission of multiple PUCCHs through multiple cells while using the original A/N timing defined per cell without inter-cell TDM by using the aforementioned methods.

Figure 26:
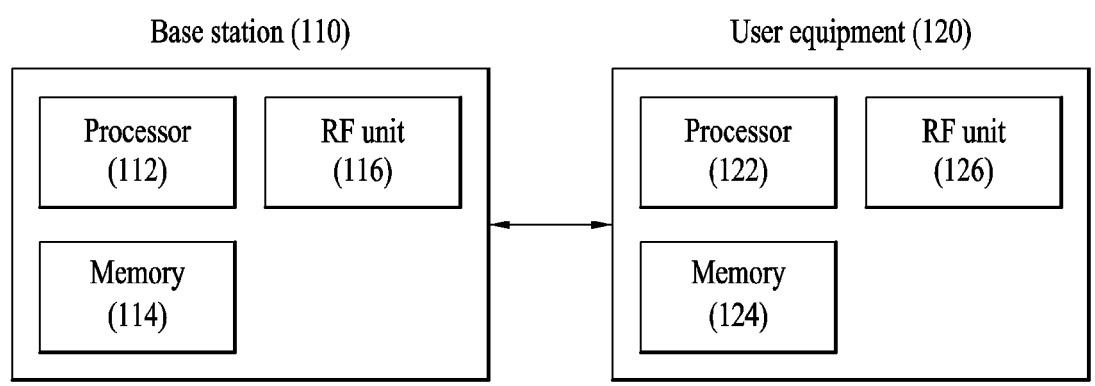
FIG. 26 is a diagram for an example of a base station and a user equipment applicable to the present invention.

FIG. 26 is a diagram for an example of a base station and a user equipment applicable to the present invention. In case that a system includes a relay, the base station or the user equipment can be replaced by the relay.

Referring to FIG. 26, a wireless communication system includes a base station (BS) 110 and a user equipment (UE) 120. The base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal. The base station 110 and/or the user equipment 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/reception relations between a user equipment and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Accordingly, the present invention can be used by such a wireless communication device as a user equipment device, a relay, a base station, and the like.

The invention claimed is:

1. A method for transmitting, by a user equipment (UE), acknowledgement/negative acknowledgement (ACK/NACK) information in a carrier aggregation based wireless communication system, comprising:
receiving one or more physical downlink control channel (PDCCH) signals in a subframe (SF) interval of a first frequency division duplex (FDD) cell,
wherein the SF interval of the first FDD cell includes one or more first downlink (DL) SFs of the first FDD cell and one last second DL SF of the first FDD cell;
receiving one or more physical downlink shared channel (PDSCH) signals indicated by the one or more PDCCH signals in the SF interval of the first FDD cell; and transmitting ACK/NACK information corresponding to the one or more PDSCH signals through a physical uplink control channel (PUCCH) in a second uplink (UL) SF of the first FDD cell corresponding to the last second DL SF of the first FDD cell, wherein one or more first UL SFs corresponding to the one or more first DL SFs of the first FDD cell are used for ACK/NACK transmission for a second FDD cell, and not used for ACK/NACK transmission for the first FDD cell, wherein, when at least one PDSCH signal is received in the one or more first DL SFs of the first FDD cell, the ACK/NACK information includes ACK/NACK responses for all DL SFs of the SF interval of the first FDD cell and is transmitted in the second UL SF of the first FDD cell by using a PUCCH resource allocated by an upper layer, and wherein, when one PDSCH signal is received only in the last second DL SF of the first FDD cell, the ACK/NACK information includes an ACK/NACK response only for the last second DL SF of the first FDD cell and is transmitted in the second UL SF of the first FDD cell by using a PUCCH resource linked to an index of a resource through which a PDCCH signal corresponding to the PDSCH signal is transmitted.

2. The method according to claim 1,
wherein, when at least one PDSCH signal is received in the one or more first SFs of the first FDD cell, the ACK/NACK information is transmitted using a PUCCH resource indicated by a value of a transmit power control (TPC) field of corresponding at least one PDCCH signal, and
wherein the TPC field value indicates one of a plurality of PUCCH resources allocated by the upper layer.

3. The method according to claim 2, wherein, when at least one PDSCH signal is received in the one or more first SFs of the first FDD cell, the ACK/NACK information is transmitted using PUCCH format 3.

4. The method according to claim 1, wherein, when one PDSCH signal is received only in the second SF of the first FDD cell, the ACK/NACK information is transmitted using a PUCCH resource acquired using a starting control channel element (CCE) index from among one or more CCE indices corresponding to one or more CCEs used to transmit a corresponding PDCCH signal.

5. The method according to claim 4, wherein, when one PDSCH signal is received only in the second SF of the first FDD cell, the ACK/NACK information is transmitted using PUCCH format 1a or PUCCH format 1b.

6. A user equipment (UE) configured to transmit acknowledgement/negative acknowledgement (ACK/NACK) information in a carrier aggregation based wireless communication system, comprising:
a radio frequency (RF) unit; and
a processor, wherein the processor is configured to
receive one or more physical downlink control channel (PDCCH) signals in a subframe (SF) interval of a first frequency division duplex (FDD) cell, wherein the SF interval of the first FDD cell includes one or more first downlink (DL) SFs of the first FDD cell and one last second DL SF of the first FDD cell,
receive one or more PDSCH signals indicated by the one or more PDCCH signals in the SF interval of the first FDD cell, and
transmit ACK/NACK information corresponding to the one or more PDSCH signals through a physical uplink control channel (PUCCH) in a second uplink (UL) SF of the first FDD cell corresponding to the last second DL SF of the first FDD cell, wherein one or more first UL SFs corresponding to the one or more first DL SFs of the first FDD cell are used for ACK/NACK transmission for a second FDD cell, and not used for ACK/NACK transmission for the first FDD cell, wherein, when at least one PDSCH signal is received in the one or more first DL SFs of the first FDD cell, the ACK/NACK information includes ACK/NACK responses for all DL SFs of the SF interval of the first FDD cell and is transmitted in the second UL SF of the first FDD cell by using a PUCCH resource allocated by an upper layer, wherein, when one PDSCH signal is received only in the last second DL SF of the first FDD cell, the ACK/NACK information includes an ACK/NACK response only for the last second DL SF of the first FDD cell and is transmitted in the second UL SF of the first FDD cell by using a PUCCH resource linked to an index of a resource through which a PDCCH signal corresponding to the PDSCH signal is transmitted.

7. The UE according to claim 6,
wherein, when at least one PDSCH signal is received in the one or more first SFs of the first FDD cell, the ACK/NACK information is transmitted using a PUCCH resource indicated by a value of a transmit power control (TPC) field of corresponding at least one PDCCH signal,
wherein the TPC field value indicates one of a plurality of PUCCH resources allocated by the upper layer.

8. The UE according to claim 7, wherein, when at least one PDSCH signal is received in the one or more first SFs of the first FDD cell, the ACK/NACK information is transmitted using PUCCH format 3.

9. The UE according to claim 6, wherein, when one PDSCH signal is received only in the second SF of the first FDD cell, the ACK/NACK information is transmitted using a PUCCH resource acquired using a starting control channel element (CCE) index from among one or more CCE indices corresponding to one or more CCEs used to transmit a corresponding PDCCH signal.

10. The UE according to claim 9, wherein, when one PDSCH signal is received only in the second SF of the first FDD cell, the ACK/NACK information is transmitted using PUCCH format 1a or PUCCH format 1b.

* * * * *